United States Patent
Rampoldi-Hnilo et al.

(10) Patent No.: US 11,270,358 B2
(45) Date of Patent: Mar. 8, 2022

(54) DUAL-PURPOSE USER-INTERFACE CONTROL FOR DATA SUBMISSION AND CAPTURING FEEDBACK EXPRESSIONS

(71) Applicant: Oracle International Corporation, Redwood Shores, CA (US)

(72) Inventors: Lynn Ann Rampoldi-Hnilo, Ijamsville, MD (US); Hillel Noah Cooperman, Seattle, WA (US); Mahlon Connor Houk, Seattle, WA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 17/172,596

(22) Filed: Feb. 10, 2021

(65) Prior Publication Data
US 2021/0165554 A1  Jun. 3, 2021

Related U.S. Application Data

(63) Continuation of application No. 16/597,550, filed on Oct. 9, 2019, now Pat. No. 10,921,951.

(51) Int. Cl.
*G06Q 30/02* (2012.01)
*G06F 3/0482* (2013.01)
*G06F 3/0481* (2013.01)
*G06K 9/00* (2006.01)
*G06F 3/0488* (2013.01)
*G06F 3/0489* (2013.01)
(Continued)

(52) U.S. Cl.
CPC ....... *G06Q 30/0282* (2013.01); *G06F 3/0482* (2013.01); *G06F 3/04812* (2013.01); *G06F 3/04817* (2013.01); *G06F 3/04883* (2013.01); *G06F 3/04892* (2013.01); *G06K 9/00281* (2013.01); *G06K 9/00315* (2013.01)

(58) Field of Classification Search
CPC .............. G06F 3/0482; G06F 3/04817; G06Q 30/0282
See application file for complete search history.

(56) References Cited

U.S. PATENT DOCUMENTS 9,798,450 B1  10/2017  Urasaki et al.
10,921,951 B1  2/2021  Rampoldi-Hnilo et al.
(Continued)

OTHER PUBLICATIONS

U.S. Appl. No. 16/597,550, Non-Final Office Action dated Jun. 24, 2020, 16 pages.
(Continued)

*Primary Examiner* — Laurence J Lee
(74) *Attorney, Agent, or Firm* — Kilpatrick Townsend & Stockton LLP

(57) ABSTRACT

A feedback button is configured to receive a feedback expression characterizing a user experience and submit information in a user interface with a single action. When the user hovers an input cursor near the feedback button, icons/text may be displayed that indicate different types of feedback expressions that may be submitted. As the user moves the cursor back and forth over the button, the icons for the different feedback expressions may be emphasized indicating locations where the button may be clicked to submit specific feedback. When the user is satisfied with the displayed feedback expression, the user may click the feedback button at the current location to submit the feedback expression and perform the final submit action for other data in the user interface.

20 Claims, 23 Drawing Sheets

(51) Int. Cl.
    *G06F 3/04812*     (2022.01)
    *G06F 3/04883*     (2022.01)
    *G06F 3/04892*     (2022.01)
    *G06F 3/04817*     (2022.01)

(56) References Cited

U.S. PATENT DOCUMENTS

| | | |
|---|---|---|
| 2005/0071479 A1 | 3/2005 | Achlioptas |
| 2012/0123823 A1 | 5/2012 | Finkelstein et al. |
| 2014/0195610 A1 | 7/2014 | Ken-Dror |
| 2015/0135138 A1 | 5/2015 | Reichert |
| 2015/0149329 A1 | 5/2015 | Tam et al. |
| 2015/0331601 A1 | 11/2015 | Rosenberg |
| 2017/0169486 A1 | 6/2017 | Farronato et al. |
| 2019/0340300 A1 | 11/2019 | Srinivasamurthy et al. |
| 2019/0377484 A1 | 12/2019 | Yamaji |

OTHER PUBLICATIONS

U.S. Appl. No. 16/597,550, Notice of Allowance dated Oct. 14, 2020, 11 pages.

| Category Name | Delete | Price | Line | Line Type | Item | Quantity | Description |
|---|---|---|---|---|---|---|---|
| Office Supplies | X | $13.12 | 1 | Goods | | 1 | Pens and pencils |
| Office Supplies | X | $8.44 | 2 | Goods | | 1 | Perforated writing pads |
| Office Supplies | X | $75.37 | 3 | Goods | | 5 | Printer ink cartridge |

Edit Requisition: 76412
Requisitioning BU - ORCLUS-iProc

Shop   Check Funds   Manage Approvals   View PDF   Submit

Requisition Lines

FIG. 1

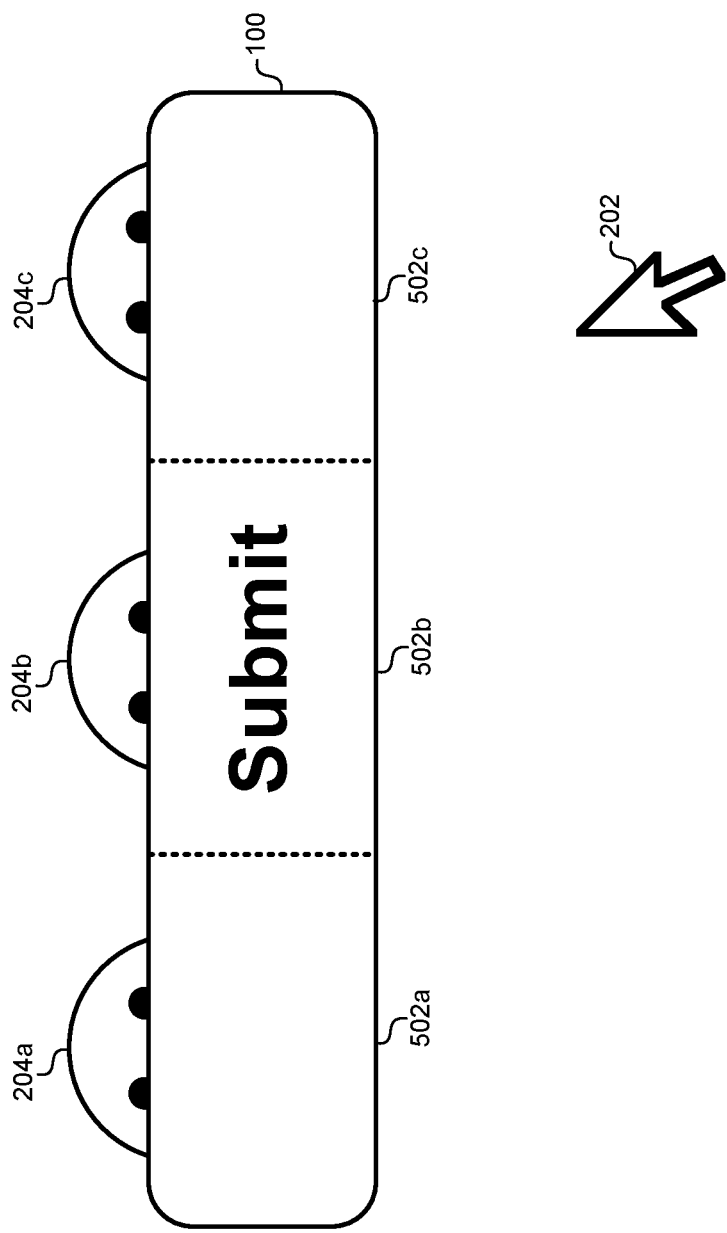

DUAL-PURPOSE USER-INTERFACE CONTROL FOR DATA SUBMISSION AND CAPTURING FEEDBACK EXPRESSIONS

CROSS-REFERENCE TO RELATED APPLICATIONS

This application is a continuation of U.S. patent application Ser. No. 16/597,550, filed Oct. 9, 2019, entitled "DUAL-PURPOSE USER-INTERFACE CONTROL FOR DATA SUBMISSION AND CAPTURING FEEDBACK EXPRESSIONS", now U.S. Pat. No. 10,921,951, issued Feb. 16, 2021, and which is hereby incorporated by reference in its entirety.

BACKGROUND

Collecting user feedback can be used to evaluate user perception of an experience with a software tool. Any system that interfaces directly with users should be designed such that the users are able to perform the intended task efficiently. However, an often-overlooked aspect of the user experience is how users perceive the overall process. This goes beyond simply determining whether a task was correctly performed, and instead looks to measure the user perception of the procedure. Performing software tasks that are not only efficient but also enjoyable causes users to return to the tool repeatedly in the future.

User feedback may be collected in a variety of ways. Some software tools send out follow-up surveys to users after a process is complete. These surveys may be sent by email, text message, or any other delivery method. However, this post hoc method separates the opportunity to provide feedback from the actual experience itself. These surveys often take minutes of user time after the fact, and thus are rarely accurate if they are completed at all. Other software tools open a pop-up dialog that asks the user about their experience during their operation of the software tool. However, this results in an interruption to the software process, pulling the user out of the very experience they are being asked to evaluate. Other software tools allow users to self-report their feedback through links or optional controls that the user must deliberately select. However, feedback initiated by users is generally negative and provides a skewed view of the overall user experience. None of these existing methods capture feedback expression with the necessary accuracy in a convenient and consistent manner.

SUMMARY

The embodiments described herein implement a user interface control that allows users to simultaneously perform a final submit of information in a user interface and provide a feedback expression describing their user experience. This button provides a nonintrusive, lightweight method of collecting user feedback that leverages an action that users are already likely to perform. For example, as a user hovers the cursor over the final action button to complete a task, the button itself can present various types of feedback expressions that may be selected and submitted by the user by clicking the button. This collects feedback from the user as they perform their submit action in a way that is simultaneous with the user experience itself without interrupting the user experience.

This user-interface control, referred to as a "feedback button" may appear as an ordinary single-action button. When the user hovers an input cursor over or near the feedback button, icons/text may be displayed that indicate the different types of feedback expressions that may be submitted when clicking the button. As the user moves the cursor back and forth over the button, the icons for the different feedback expressions may be highlighted or emphasized indicating locations where the button should be clicked to submit specific feedback expressions. For example, icons illustrating facial expressions that correspond to different levels of feedback (e.g., happy, unhappy, etc.) may be displayed as the user moves the cursor over different portions of the feedback button. When the user is satisfied with the displayed feedback expression, the user may click the feedback button at the current location to submit the feedback expression and perform the final submit action for other data in the user interface.

From the user interface perspective, the user interface may present a view of a button that is rendered as part of the user interface. A determination can be made when an input indicator, such as a cursor or finger tap hovers within a region surrounding the button. In response, graphic icons or other visual indicators can be displayed that correspond to the various available feedback expressions. For example, the button may be divided into a plurality of regions, each of which is associated with a particular feedback expression and/or displayed icon. In certain cases, such as during a user's first interaction with the feedback button, text may also be displayed explaining the operation of the feedback button to the user. Moving the cursor back and forth over the button may cause animations to be displayed using the feedback icons, such as causing the icons to pop up and down from behind the button as the cursor hovers over corresponding regions of the button. When the user clicks the button, the user interface can receive the input at a particular location on the button. The user interface may then determine a region on the button corresponding to the input and record the selected feedback expression. Clicking the button may also cause data entered in the user interface to be stored in a database or processed, depending on the purpose of the user interface.

The feedback button properties may be implemented as an extension of a standard control in a user interface toolbox. This may allow the feedback functionality to be applied to any control in addition to the final action button used as an example above. The feedback functionality may be turned on/off at each level of a software implementation, including in a single instance of the application, across application installations for a particular customer, and across all application installations provided by a software provider.

BRIEF DESCRIPTION OF THE DRAWINGS

A further understanding of the nature and advantages of various embodiments may be realized by reference to the remaining portions of the specification and the drawings, wherein like reference numerals are used throughout the several drawings to refer to similar components. In some instances, a sub-label is associated with a reference numeral to denote one of multiple similar components. When reference is made to a reference numeral without specification to an existing sub-label, it is intended to refer to all such multiple similar components.

FIG. 1 illustrates a view of a user interface, according to some embodiments.

FIG. 5 illustrates how the button can be divided into a plurality of regions, according to some embodiments.

DETAILED DESCRIPTION

Figure 2:
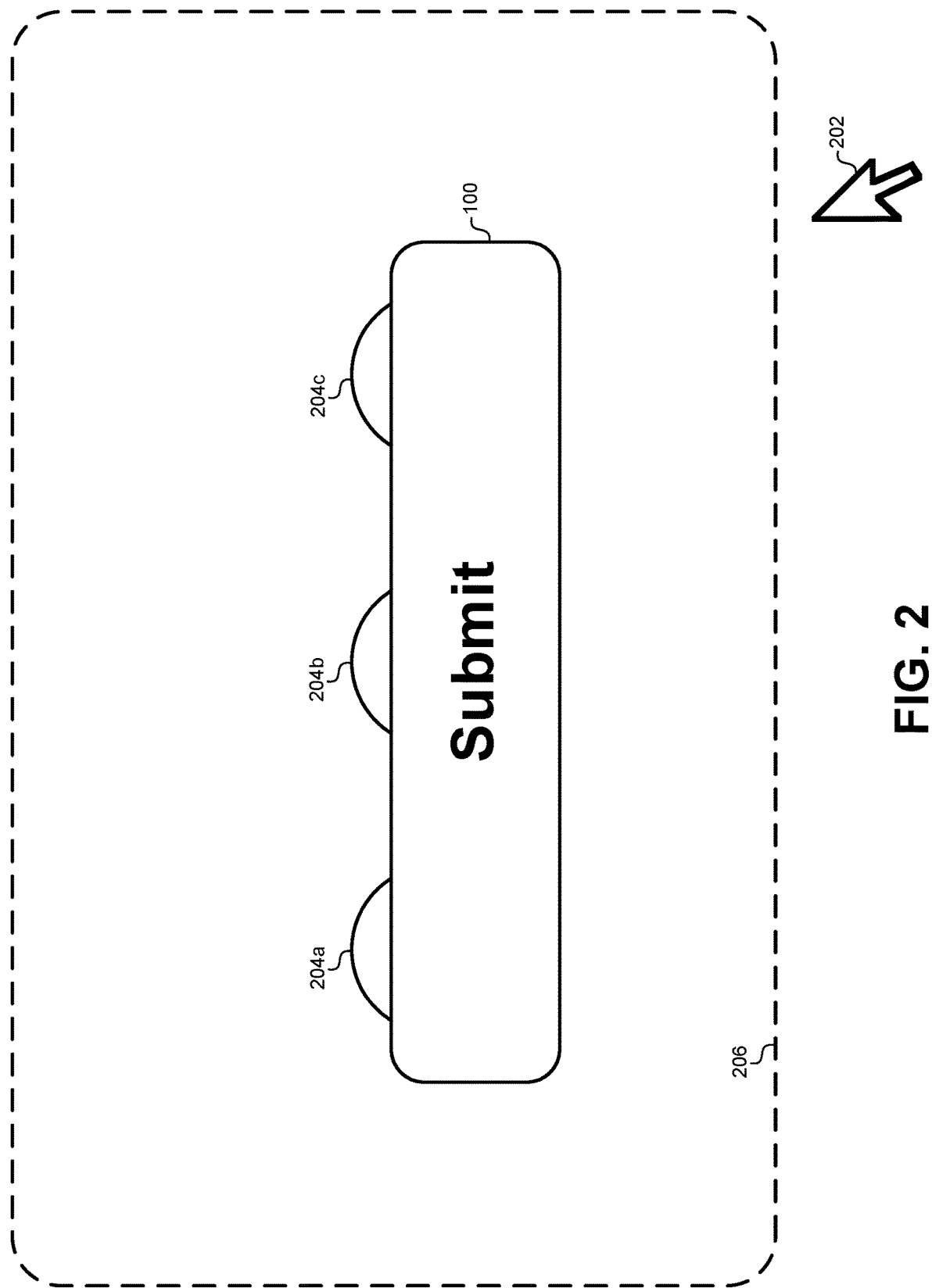
FIG. 2 illustrates a detailed view of the submit button, according to some embodiments.

The embodiments described herein implement a user interface control that allows users to simultaneously perform a final submit of information in a user interface and provide a feedback expression describing their user experience. This button provides a nonintrusive, lightweight method of collecting user feedback that leverages an action that users are already likely to perform. For example, as a user hovers the cursor over the final action button to complete a task, the button itself can present various types of feedback expressions that may be selected and submitted by the user by clicking the button. This collects feedback from the user as they perform their submit action in a way that is simultaneous with the user experience itself without interrupting the user experience.

FIG. 1 illustrates a view of a user interface 102, according to some embodiments. The user interface 102 may include a plurality of different components. These components may be configured to provide information to a user and/or to receive information from a user. Information may be provided in the form of text, graphics, animations, sounds, video, and/or other output techniques. Information may be received by the user interface through text fields, microphones, buttons, and/or other input techniques. The combination of components in the user interface 102 may create an interactive experience for the user. Where information can be dynamically provided and/or received at run time.

In some embodiments, the user interface 102 may be comprised of a single view, such as the webpage or web form illustrated in FIG. 1. In other embodiments, the user interface 102 may include a plurality of progressive web forms or webpages that can be sequentially navigated by the user. In mobile applications, the user interface may be provided through a mobile application ("app") that includes one or more input screens that receive finger-tap inputs from the user. Each display screen, web form, webpage, or other presentation of the user interface 102 may include one or more components that may provide information or receive information from the user.

The user interface 102 may be used to receive a set of related information from a user, whether being comprised of a single display or multiple displays. This set of information may be related together or related to another item such that the set of information may be processed together. For example, the user interface 102 may receive information as part of a transaction. FIG. 1 illustrates a type of transaction known as a requisition or procurement that may be processed by a cloud application. The transaction may include multiple pieces of information that may be combined together to define the transaction. For example, a transaction may include information describing items, item quantities, prices, item categories, item descriptions, users, usernames, and user titles/roles. Each of these pieces of information may be provided through individual controls in the user interface 102. Therefore, in contrast to simple data submissions handled by some embodiments (e.g., receiving one, two, three, etc. data fields), some embodiments may instead receive a large number of data entries received through a plurality of components (e.g., 10, 12, 15, etc. data fields).

Completing large data transactions that require multiple data fields to be populated may be a complicated, difficult, and/or error-prone process for users. Due to the large amounts of information that need to be provided for the session to be successful, some users may find this overall process to be difficult and frustrating. When users become frustrated, they become less likely to continue using the software application and more likely to make mistakes when providing information. This is particularly true given the rapid digitization of most everyday processes that users traditionally experience. Everything from completing a purchase, signing a petition, registering for school, and ordering groceries may require the completion of online forms and transactions such as those described above.

In order to make these experiences palatable for users, great effort is put into designing the user interface 102 such that it provides a user experience that is fast, efficient, easy, and accurate. Great importance may be placed on creating a user experience that generates a positive sentiment in the way the user perceives the experience. For example, placement of various controls on the user interface 102 can make the flow of information intuitive and easy for a user to complete. Colors, animations, and graphics can be used to make the user interface 102 visually appealing. Instructional tools and "help" resources may be provided in an unobtrusive manner such that questions can be answered quickly during the information input process. Information may be logically separated into different forms such that topics are addressed one-at-a-time by the user. These and many other techniques may be used to design the user interface 102 such that the overall experience is positive for the user.

However, these techniques for designing a positive user experience are difficult to test and evaluate during use. All of the existing methods for receiving feedback about a user experience either place additional burdens on the user or are unlikely to generate an honest response. For example, some existing applications may use a pop-up window that requests feedback from the user. After completing a large number of input fields in the user interface 102, users are likely to be frustrated when asked to participate in yet another pop-up window, even when the request is as simple as asking the user to "rate your experience." Other existing techniques may be less frustrating, but may not provide immediate feedback. For example, some existing solutions send a text message or email to the user requesting feedback regarding their experience. However, since users often complete such feedback options after completing the experience with the user interface 102, such feedback is less likely to be accurate since it is removed in time from the actual experience. No existing solutions provide a feedback mechanism that is both convenient and immediate to accurately capture user sentiment regarding the user interface experience. The embodiments described herein provide such a solution by augmenting a component in the user interface 102 such that it can provide an immediate assessment of user sentiment.

The user interface 102 illustrates a number of different user interface components that may be part of the user experience which may also be candidates for also measuring user feedback. These components may include text fields, drop-down menus, radio buttons, input fields, graphics, and/or any other user interface components. One common type of input component is the traditional user-interface button. Buttons may receive an input from a user in the form of a click of a mouse, an activation of a cursor, a received finger tap, and/or other input methods that are able to activate the button. Generally, buttons may perform a primary function that is executed when the button is clicked, tapped, etc. For example, the underlying code in the user interface 102 may include a method, such as OnButtonClick( ) that is executed when an input is received through the button control. Additionally, some buttons may include additional methods that execute additional functions associated with different types of inputs. For example, some buttons may include code that is executed when a cursor or mouse "hovers" over the button. The mouse cursor or hovering finger may be referred to generally as an "input indicator" that can be hovered over or within an area before receiving an input (e.g., a mouse click).

Some buttons may be designated as "final action buttons," such as final submit buttons or submit buttons. These may be distinguished from ordinary buttons in that the submit buttons cause the information received during the web session to be stored by an underlying application and made available for processing together as a packet of information. This may include saving the information as a record in a database. For example, the user interface 102 includes a submit button 100 that may be classified as a final submit button. Clicking the button 100 may cause the information received through the user interface 102 defining a purchase order to be saved together as one or more related records. In some embodiments, activating the button 100 may also cause the session through the user interface 102 to begin a new data-entry session. For example, clicking the button 100 may cause text to be removed from fields such that another transaction can be input by the user. Clicking the button 100 may also cause a series of web forms to be reset such that a first web form is again presented to the user in a series of web forms.

The submit button 100 may be augmented as described above to perform a second function in addition to submitting the information provided by the user for processing. Specifically, the submit button 100 may be augmented such that it is configured to also solicit and receive a feedback expression from the user. A "feedback expression" may include any characterization of the user sentiment towards the data entry and submission process. The feedback expression may include a sentiment towards the process itself, towards the look and feel of the user interface, towards the functionality of the user interface 102, and/or any other aspect of the user experience. The advantage of using the submit button 100 for collecting user feedback is that an input may be required by the submit button 100 in some embodiments to submit the information entered by the user. In contrast to other methods for soliciting user feedback, the submit button 100 may not be avoided when completing the transaction in some embodiments. Thus, the user is likely to provide immediate, accurate feedback using the submit button 100.

FIG. 2 illustrates a detailed view of the submit button 100, according to some embodiments. Going forward, the submit button 100 may be referred to simply as a "button" to emphasize that any button may be augmented with the described functionality. It may also be referred to as a "feedback button" or a "layered feedback button" to emphasize the two different functions that are performed by the single button. Although some embodiments may use the submit button from the user interface 102 in FIG. 1, not all embodiments are so limited. Other embodiments may use any button or control in the user interface. Additional examples of such non-button controls are described later in this disclosure. However, the submit button 100 will be used as an example on the following figures to illustrate how a feedback expression may be requested and received.

The button 100 may include one or more visual indicators that indicate the presence of feedback functionality to the user. In the example of FIG. 2, the button 100 may include a plurality of icons 204 that appear to "hide behind" the button 100. These icons 204 may be dormant or hidden to the extent they do not obscure or interfere with the normal look-and-feel of the button 100. However, they may be visible to the extent that they indicate that the button 100 is different from other standard buttons in the user interface. In this example, the icons may include graphic representations of user sentiment (e.g., smiley faces, frowning faces, etc.) as described in detail below. However, in the dormant state, these icons 204 may be hidden behind the button 100 or otherwise not prominently displayed to avoid interfering with or distracting from the user experience.

The button 100 may include a region 206 around the button 100 that can be used to alert users to the additional functionality of the button 100 beyond the normal submit function. The region 206 around the button 100 may be statically or dynamically sized based on the size and/or shape of the button 100. For example, the shape of the region 206 may be substantially the same as the shape of the button 100. The size or dimensions of the region 206 (e.g., length, width) may be a multiple of the size or dimensions of the button 100. For example, the dimensions of the region 206 may be two times, three times, four times, five times, six times, seven times, etc., that of the button 100. When the cursor 202 is outside of the region 206, the button 100 may appear as normal as depicted in FIG. 2. Any visual indicators that indicate additional the functionality of the button 100 may be in a dormant state, such as the icons 204 illustrated in FIG. 2.

Figure 3:
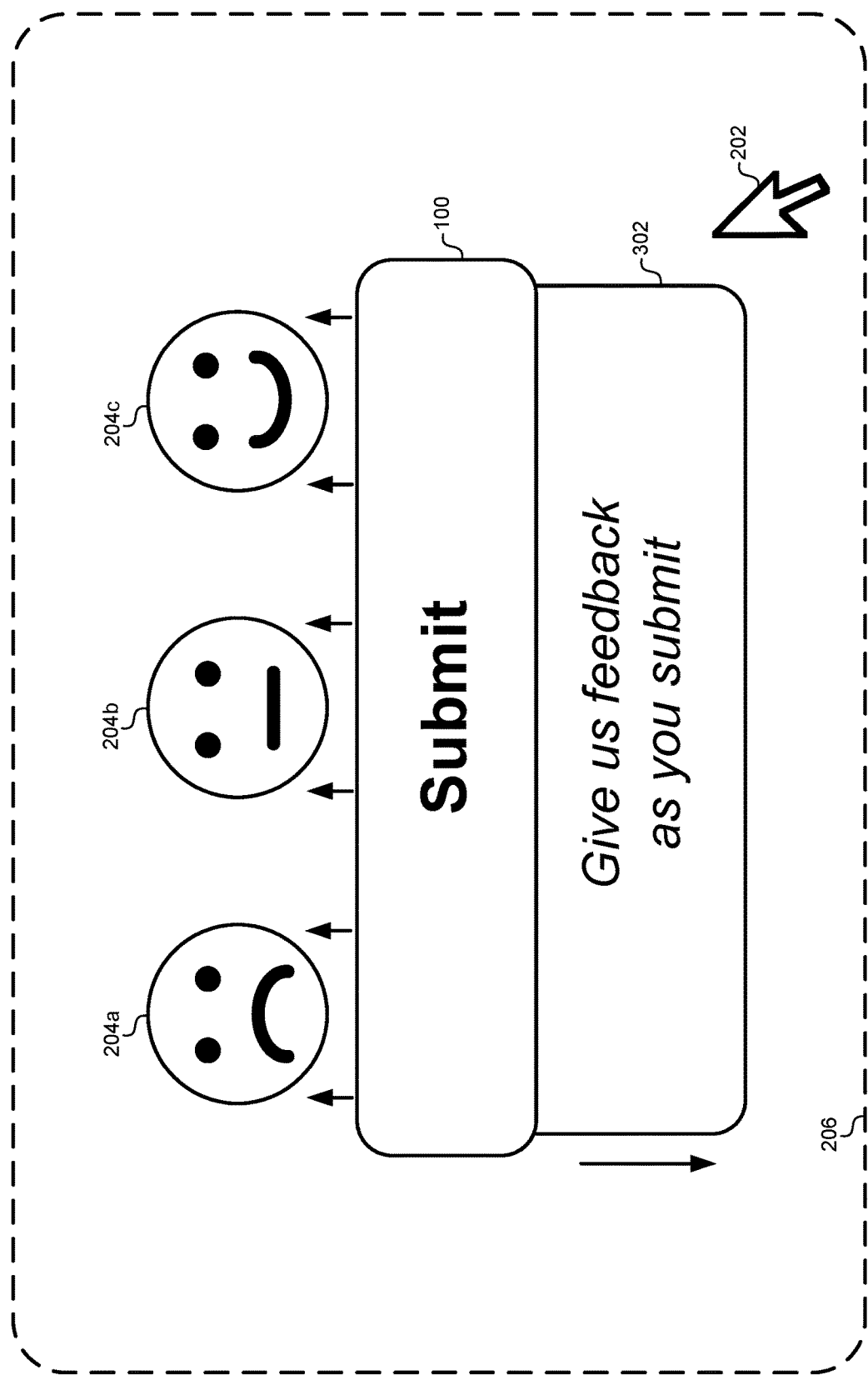
FIG. 3 illustrates a feedback button when the cursor is brought within a predetermined proximity of the feedback button, according to some embodiments.

FIG. 3 illustrates a feedback button 100 when the cursor 202 is brought within a predetermined proximity of the feedback button 100, according to some embodiments. The region 206 surrounding the button 100 may include handler functions that detect when the cursor 202 enters or hovers in the region 206. Thus, when the user moves the cursor 202 near the button 100, code may be executed such that the button 100 provides additional outputs to the user indicating that the button 100 allows the user to submit feedback regarding the user experience.

Many different types of visual indications may be provided by the button 100 when the cursor 202 moves near the button 100 or within the region 206. In this example, these visual indications may include causing the icons 204 to move out from behind the button 100. For example, the icons 204 may include a frowning face 204*a*, a neutral face 204*b*, and/or a smiling face 204*c*. These icons 204 may move in an upward direction such that they move out from behind the button 100 and display their facial expressions and be visible to the user. This may indicate to the user the difference types of feedback expressions that may be submitted to describe their user experience. Additionally, some embodiments may display textual information that describes the feedback operation of the button 100. In this example, a drop-down box 302 may drop down from beneath the button 100 and include text that describes the feedback functionality of the button 100. Other embodiments may use visual indicators other than facial expressions, such as light bulbs, checkboxes or X's, thumbs up/thumbs down, and so forth.

The icons 204 and the drop-down box 302 illustrated in FIG. 3 are provided only by way of example and are not meant to be limiting. Other embodiments may include different visual indicators or methods to indicate to the user that the button 100 has additional feedback functionality. Some embodiments may display a balloon window with a text description as the cursor hovers over or near the button 100. Some embodiments may cause animations to be played that illustrate how various feedback expressions can be selected by the user. Some embodiments may cause the shape of the button 102 be altered to show the different feedback expressions available. Some may cause the color and/or any other visual characteristic of the button 100 to be changed. These different methods of indicating the feedback functionality of the button 100 may be combined in any combination and without limitation.

Figure 4A:
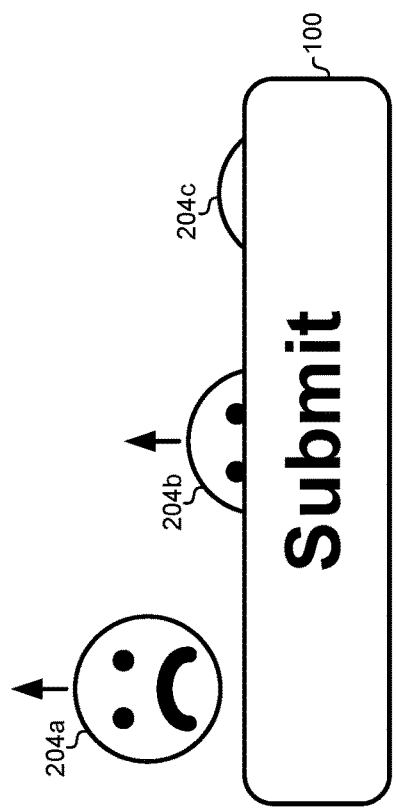
FIGS. 4A-4D illustrate an animation for the button indicating the feedback functionality, according to some embodiments.
Figure 4B:
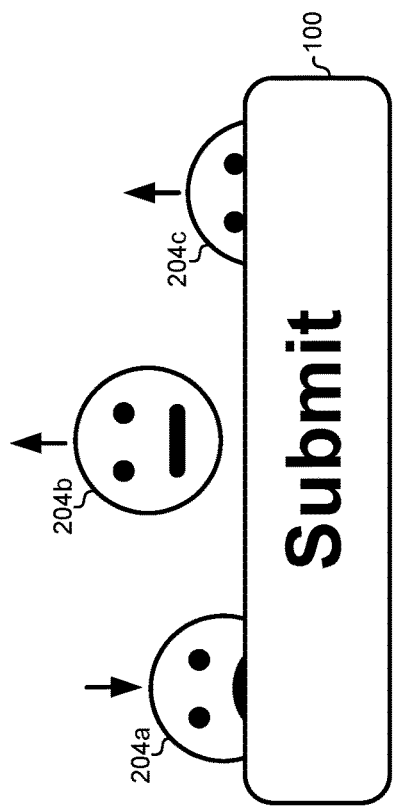
Figure 4C:
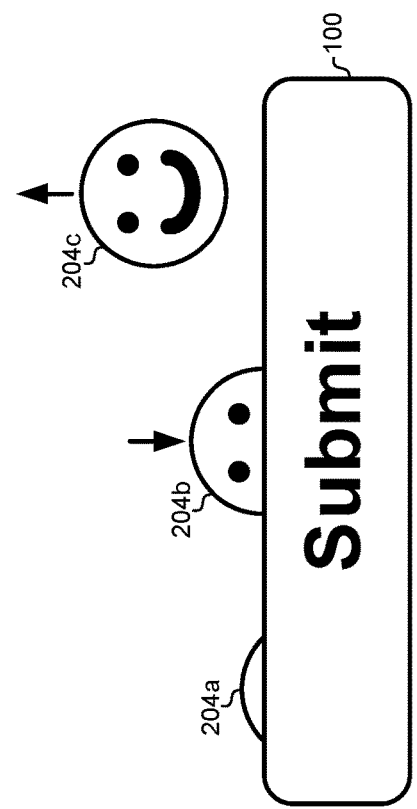
Figure 4D:
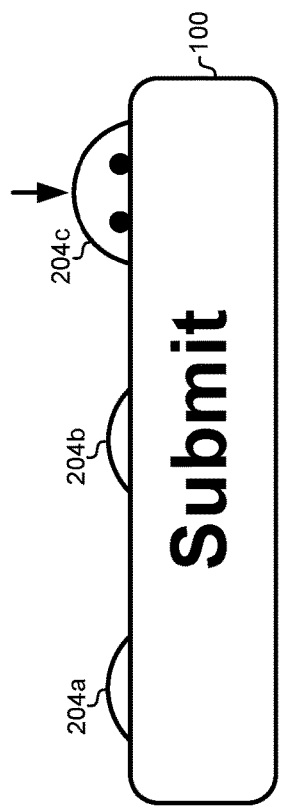

FIGS. 4A-4D illustrate an animation for the button 100 indicating the feedback functionality, according to some embodiments. As described above, when the user moves the cursor near the button 100 (e.g., within the region 206), the button 100 may provide visual indications indicating the feedback functionality of the button. Some embodiments may include an animation of the icons 204 that places additional visual emphasis on the feedback expressions made available by the button 100. In this example, each of the three icons 204 may sequentially "pop up" from behind the button 100. As illustrated in FIG. 4A, the first icon 204*a* may pop up from behind the button. As the first icon 204*a* reaches its highest position, the second icon 204*b* may also begin to pop up. As illustrated in FIG. 4B, the second icon 204*b* may pop up fully as the first icon 204*a* settles back into its original position behind the button. Additionally, the third icon 204*c* may begin to pop up as the second icon 204*b* reaches its peak. Continuing with FIG. 4C, the second icon 204*b* may return to its original position behind the button 100 as the third icon 204*c*, reaches its peak position. Finally, the third icon 204*c*, may return to its initial position behind the button 100 in FIG. 4D.

This type of animation may be performed a single time when the cursor is near the button 100. Alternatively or additionally, the animation may be performed multiple times in a loop while the cursor is within the region 206 near the button 100 but not yet over the button 100. This may entice the user to continue moving the cursor towards the button until the user is able to interact with the button directly. In some embodiments, this type of animation or visual indication of the feedback functionality of the button 100 may be performed a single time when the user first moves the cursor near the button 100. For example, the first time the user moves the cursor within the region 206, the button 100 may perform the animation illustrated in FIGS. 4A-4D and provide the drop-down box 302 in FIG. 3. However, if the user moves the cursor 202 out of the region 206 and then moves the cursor 202 back into the region 206, the animation need not be performed again.

FIG. 5 illustrates how the button 100 can be divided into a plurality of regions, according to some embodiments. In order to minimize the burden on the user and increase the likelihood that they will provide meaningful feedback, the feedback functionality may be tightly integrated with the submit functionality of the button 100. Normally, a user may click on the button 100 to submit the information in the user interface for processing. The embodiments described herein leverage this single action to provide the submit function and provide a feedback expression for the user experience. The click itself may activate the submit function of the button 100, and the location of the click may be used to determine a feedback expression for the user experience.

In some embodiments, the button 100 may be divided into a plurality of individual regions 502, each of which is associated with a predefined feedback expression. For example, the left portion of the button 100 may comprise a first region 502*a* that is associated with a feedback expression indicating that the user is unhappy with the user experience. The center portion of the button 100 may comprise a second region 502*b* that is associated with a feedback expression indicating that the user is generally okay or neutral regarding the user experience. The right portion of the button 100 may comprise a third region 502*c* that is associated with a feedback expression indicating that the user is happy with the user experience.

Determining the feedback expression for the user experience may be accomplished by determining a location of where the button 100 is clicked by the cursor 202. For example, if the cursor 202 in region 502*a* when the button 100 is clicked, the feedback expression indicating that the user is unhappy with user experience may be submitted. If the cursor 202 is in region 502*b* when the button 100 is clicked, the feedback expression indicating that the user is generally okay or neutral with user experience may be submitted. If the cursor 202 is in region 502c when the button 100 is clicked, the feedback expression indicating that the user is happy with the user experience may be submitted. Thus, the selection of a feedback expression may be based at least in part on a location of where an input received on the button 100. As described above, the input may be received by the button 100 by a mouse click, a finger tap, and/or any other input mechanism available to the user interface.

Although the example of FIG. 5 uses a relatively small number of discrete regions for determining a feedback expression, other embodiments may use many smaller regions, and some may use very small regions that approximate a continuous spectrum of feedback expressions. For example, the length of the button 100 may be subdivided into many smaller vertical regions. In the extreme case, the button 100 may be divided into screen coordinates or pixels as it is displayed on the screen. The input received from the cursor 202 may include a pixel or coordinate of the cursor 202 when the button 100 is activated. That coordinate may be used in relation to the display coordinates of the button 100 to determine a feedback expression. For example, a mouse click that is approximately 43% of the length of the button 100 from the left side of the button 100 may correspond to a feedback expression that is approximately 43% happy with the user experience. Moving the cursor along the length of the button 100 may, by virtue of the position of the input received, approximate a continuous range of feedback expressions.

In some embodiments, the regions 502 of the button 100 need not be visible to the user unless the button 100 is selected or the cursor is hovered over the button 100. The regions 502 also need not be individually selectable such that they perform a different submit function for the button 100. Instead, the button 100 may appear to the user to be a single, simple, traditional button control that performs the expected functionality. In this way, the button may be contrasted with other user interface controls that include multiple selectable regions, such as components having multiple buttons, radio button groups, and/or other components that have different objects that may be selected to perform different functions. The button 100 may be a single control that appears to the user to only have a single selectable region.

Figure 6:
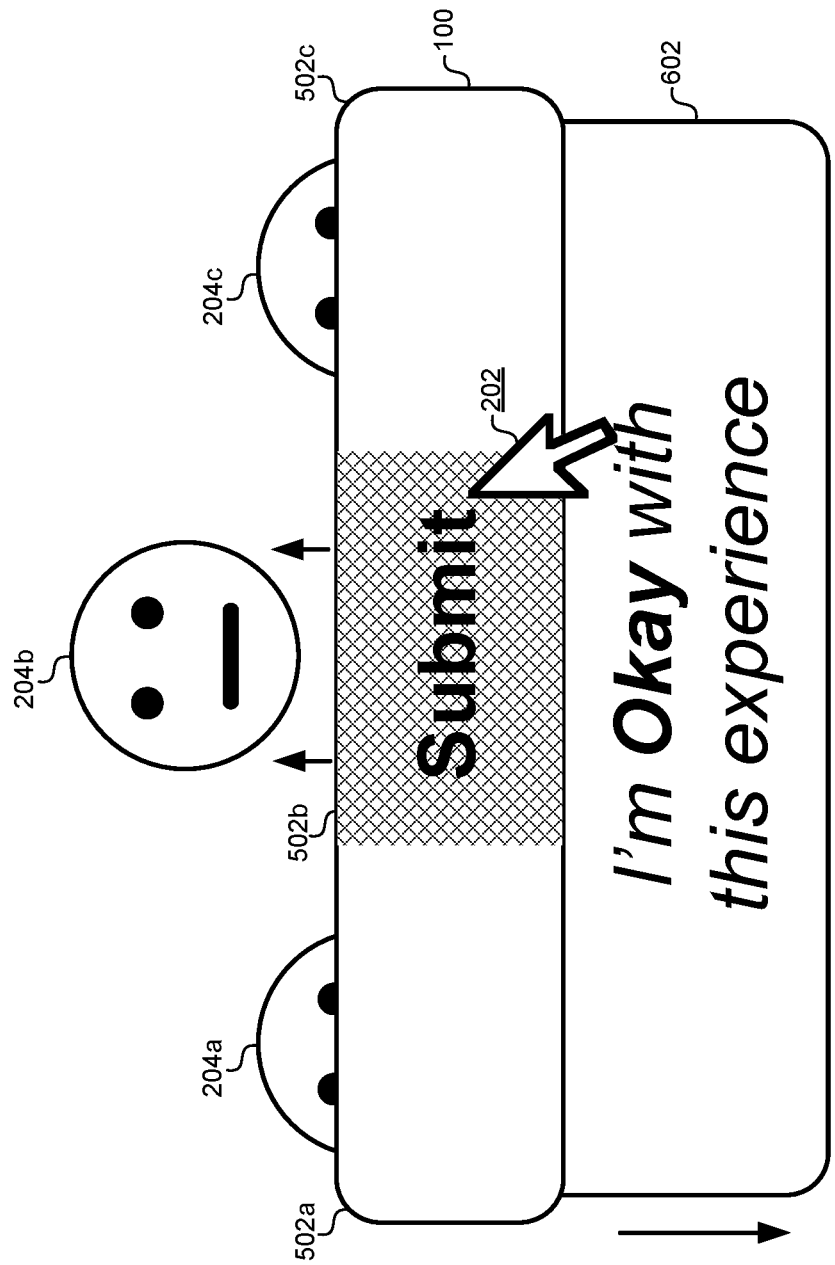
FIG. 6 illustrates functionality of the button when the cursor hovers over portions of the button, according to some embodiments.

FIG. 6 illustrates functionality of the button 100 when the cursor hovers over portions of the button 100, according to some embodiments. When the user hovers the cursor 202 over portions of the button 100 corresponding to specific feedback expressions, visual indications of those feedback expressions may be provided to the user. This allows the user to see and adjust their selected feedback expression before clicking the button 100 and submitting the feedback expression along with the other data in the user interface for processing. As the user moves back and forth across the button 100 with the cursor 202, the different available feedback expressions may be displayed for the user to view and evaluate. Somebody must may also provide textual descriptions of each feedback expression so that the combination of text and graphical feedback may clearly define the feedback expression being selected by the user.

For example, FIG. 6 illustrates example behavior of the button 100 when the cursor 202 is hovered over the center region 502b before the button 100 is selected. When the cursor 202 hovers within the region 502b, some embodiments may change the physical characteristics of the region 502b of the display of the button 100. For example, some embodiments may change the color, transparency, shading, fill pattern, and/or other visible characteristics of the region 502b of the button 100 to indicate to the user that they are able to select a feedback expression associated with clicking in that region 502b. Note that before the cursor 202 hovers over the region 502b, the region 502b may be hidden from the user such that the button 100 appears to be a single continuous region. In some embodiments, the visible characteristics of the region 502b may remain unchanged.

In addition to changing the visual characteristics of the region 502b itself, some embodiments may also provide additional visual indications that the user has selected a particular region within the button 100. These additional visual indications may also indicate a particular feedback expression that may be selected by clicking the button 100 in the region 502b. For example, some embodiments may cause an icon 204b that represents the feedback expression to "pop up" from behind the button 100. The icon 204b may pop up in an animated fashion such that it moves up from behind the button 100 and stays visible as long as the cursor 202 is within the region 502b. The facial expression on the icon 204b may illustrate the feedback expression (e.g., generally okay or neutral) for the user experience.

Some embodiments may also include a drop down box 602 that provides a text description of the feedback expression currently selected by the user. Although many users may be adept at expressing sentiment using icons (e.g., emojis), other users may want to be more precise with their feedback expression. The drop-down box 602 may describe textually what is visually indicated by the icon 204b such that the user can have confidence in submitting the correct feedback expression for their user experience.

The drop-down box 602, the icon 604b, and/or the change in visual appearance to the region 502b may stay active while the cursor 202 hovers over the region 502b. When the cursor exits the region 502b, then the drop-down box 602, the icon 604b, and/or the change in visual appearance to the region 502b may disappear or return to their default state illustrated in FIG. 5. For example, the icon 204b may drop back down behind the button 100 in an animated fashion; the drop-down box 602 may move back up behind the button 100, also in an animated fashion; and the visual appearance of the region 502b may change back to normal such that the button 100 appears to be a single selectable region. These changes may also occur if the cursor 202 is clicked within the region 502b, thereby causing the selected feedback expression to be submitted with the other information in the user interface.

Figure 7:
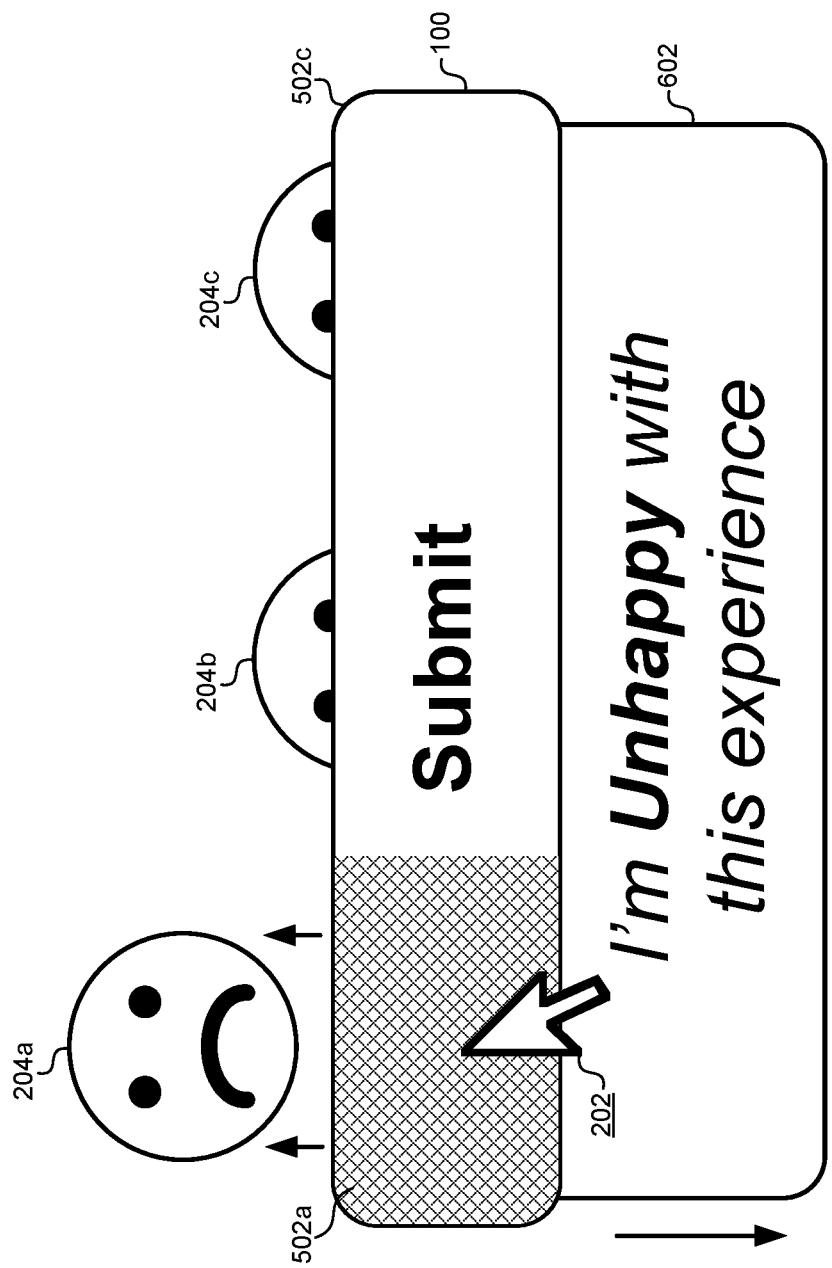
FIG. 7 illustrates the functionality of the button as the cursor moves between regions in the button, according to some embodiments.

FIG. 7 illustrates the functionality of the button 100 as the cursor 202 moves between regions in the button 100, according to some embodiments. As the cursor 202 moves to hover over the region 502a, the visual appearance of the region 502a may be changed as described above for region 502b in FIG. 6. Additionally, the icon 204a representing an unhappy user experience may "pop up" from behind the button 100 as described above. The drop-down box 602 may include text that describes the feedback expression as being unhappy with the user experience.

The transition between the display illustrated in FIG. 6 and the display illustrated in FIG. 7 may occur as the cursor 202 moves horizontally along the button 100. For example, as the cursor 202 moves to the left from region 502b into region 502a, the display may transition from that of FIG. 6 to the display of FIG. 7. Additionally, the display of FIG. 7 may be triggered when the cursor 202 moves from outside of the button 100 into the region 502a. Animations may occur with the transitions between these displays. For example, the drop-down box 602 may retract up and drop back down when transitioning between the displays of FIG. 6 and FIG. 7 with the changed text. The icons 204a, 204b may pop up and down in an animated fashion as illustrated in FIGS. 4A-4D above. These transitions may make it clear to the user that the movement of the cursor and its location in the button 100 are used to select the appropriate feedback expression.

Figure 8:
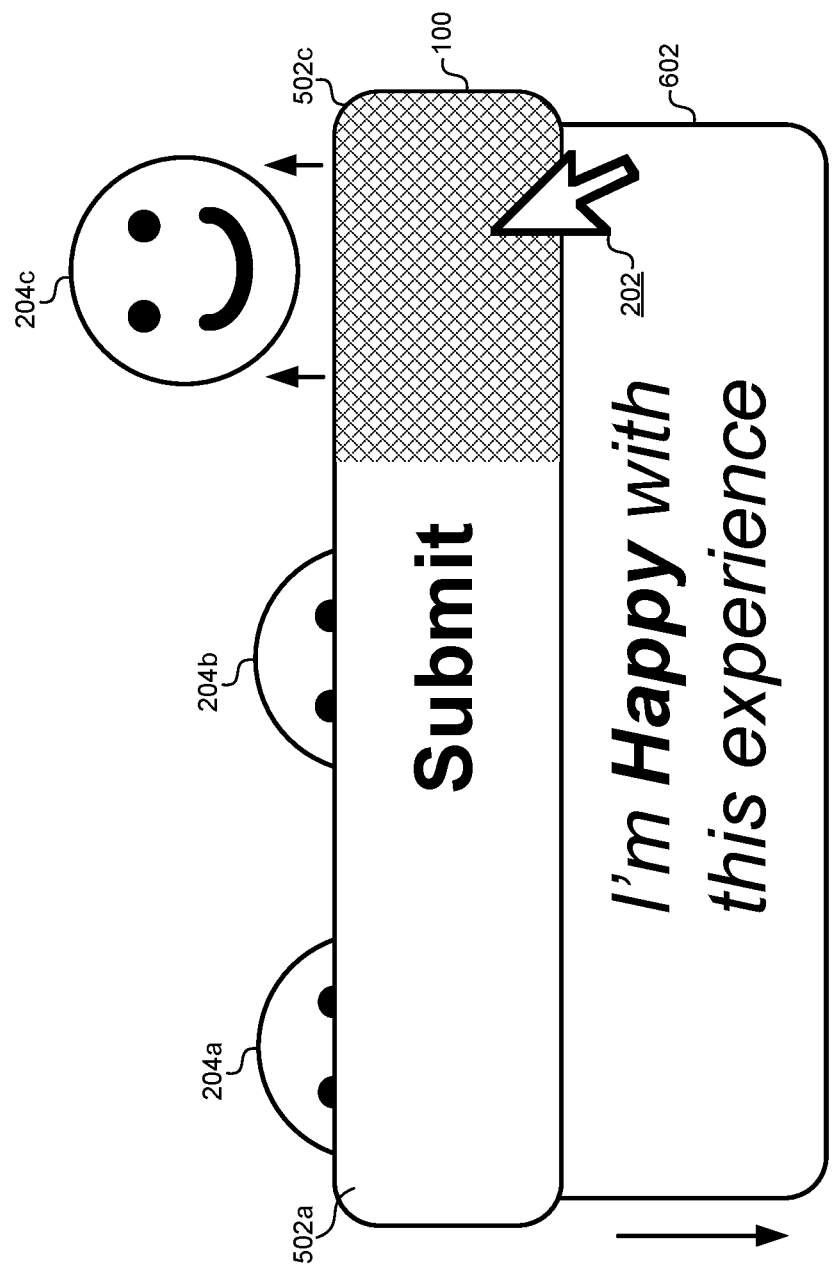
FIG. 8 illustrates the functionality of the button as the cursor continues to move between regions, according to some embodiments.

FIG. 8 illustrates the functionality of the button as the cursor 202 continues to move between regions, according to some embodiments. As described above, when the cursor 202 moves into region 502c the icon 204c may pop up from behind the button 100 to visually indicate the selected feedback expression, the text in the drop-down box 602 may describe the selected feedback expression, and the change of the visible characteristics of the region 502c may indicate where on the button 100 the cursor 202 should be clicked to select that feedback expression. The particular feedback expression in FIG. 8 is one indicating that the user is happy with the user experience.

The user may move the cursor 202 back and forth across the button 100 to see the available feedback expressions before selecting a final feedback expression for submission. As the state of the button changes between the displays of FIGS. 6-8, the user may clearly see the available feedback expressions, along with the regions in the button 100 that are associated with the corresponding feedback expressions. When the user has selected the appropriate feedback expression, a input (e.g., mouse click, finger tap, etc.) may be received in the selected region to submit the corresponding feedback expression for the user experience along with the primary final action (e.g., data submit).

Figure 9:
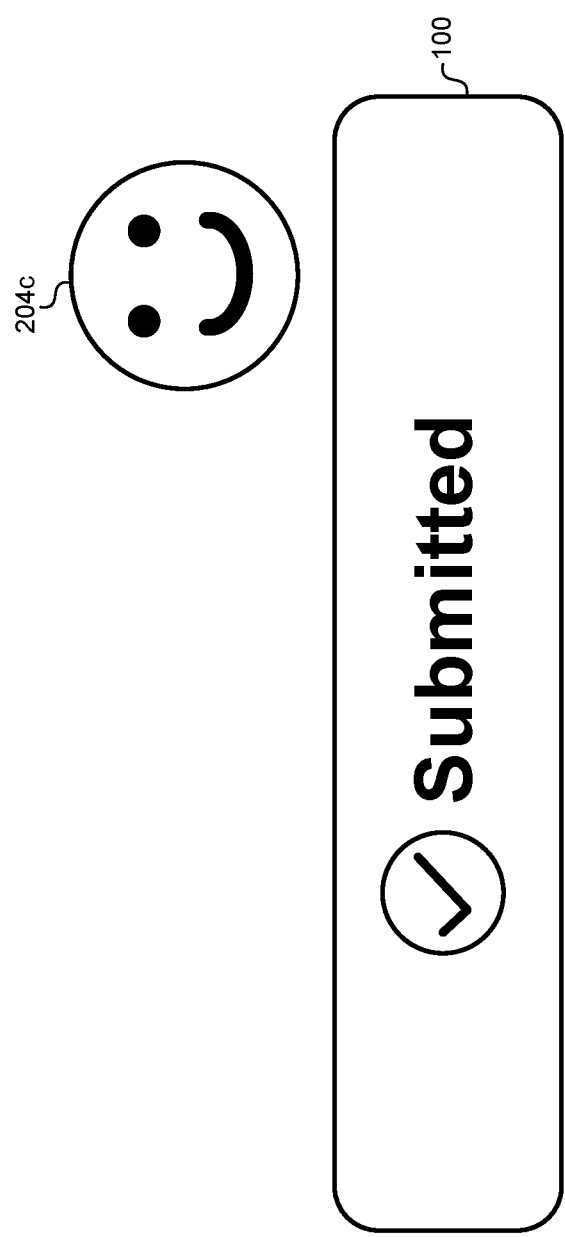
FIG. 9 illustrates the appearance of the button when an input is received by the button to submit the feedback expression and user interface data, according to some embodiments.

FIG. 9 illustrates the appearance of the button 100 when an input is received by the button to submit the feedback expression and user interface data, according to some embodiments. When the input is received, the button may execute code that submits the data received by the user interface to be processed. This may include submitting data defining a transaction, a requisition, a purchase order, a database table, a scheduling item, a web form, and/or any other batch of information that may be provided through a web interface.

In addition to submitting the user interface data, the button may record a location on the button 100 at which the input was received. This may correspond to a location where a mouse was clicked, a finger was tapped, and/or any other input mechanism was provided on the button 100. Location of the input may then be used to select a corresponding feedback expression. As described above, some embodiments may assign predetermined feedback expressions to regions within the button 100 where the input location may be received. Some embodiments may determine a percentage or location across a pseudo-continuous spectrum to provide a numerical characterization of the user experience as a feedback expression (e.g., 33%, 49%, 75%, etc.). As described below, the submission of the user interface data and the submission of the feedback expression may be routed to different databases and/or processing systems.

The appearance of the button 100 may also be changed such that the user can have confidence that the data from the user interface was properly submitted. The button 100 may also provide definite feedback confirming the selection of the desired feedback expression. In the example of FIG. 9, the appearance of the button 100 may be changed such that it indicates that the submit operation is complete. For example, the text on the button 100 may change from "Submit" to "Submitted." Some embodiments may also provide an icon or other graphical indicator when the submit operation is complete. For example, the button 100 may include a check mark or other icon indicating the completion of the operation.

In the example of FIG. 9, the icon 204c representing the feedback expression may also be displayed above the button 100. As described above, the icon 204c may previous have been displayed when the cursor 202 hovered over the corresponding region 502c. Therefore, the icon 204c may remain displayed above the button 100 when the button 100 is clicked. The icon 204c may be displayed for a time interval such that it is visible to the user with the change to the appearance of the button 100. For example, the display of the button 100 and the icon 204c may appear as illustrated in FIG. 9 for one second, two seconds, three seconds, four seconds, five seconds, six seconds, and so forth, after the button 100 is clicked. At the expiration of the time interval, the display of the button may revert back to its appearance illustrated in FIG. 2. Some embodiments may also provide a confirmation message as well as a graphical indication. For example, some embodiments may present a confirmation on the current page or on a subsequent page, such as "Expense Report XXXXX was submitted. Your feedback for your experience being XXXX was also received."

Figure 10:
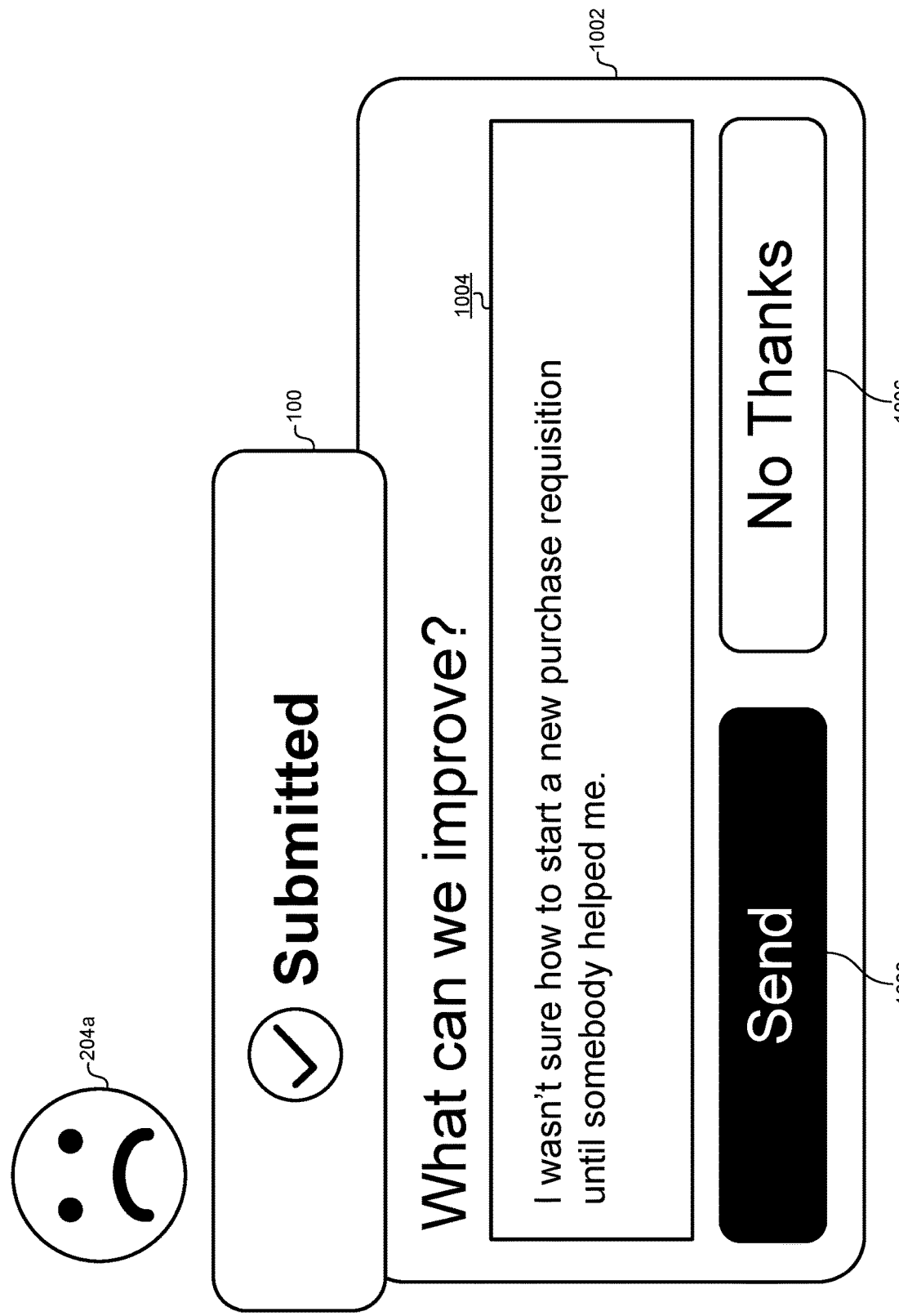
FIG. 10 illustrates a pop-up window that may be displayed when certain types of feedback expressions are selected, according to some embodiments.

FIG. 10 illustrates a pop-up window that may be displayed when certain types of feedback expressions are selected, according to some embodiments. Some users may wish to provide more detail in addition to the selected feedback expression chosen when clicking the button 100. In some cases, users may feel that the feedback expression selected using the button 100 was not sufficient to adequately describe any problems they had with the user experience. Some users may also want to provide additional positive feedback describing aspects of the user experience that were particularly well-received. While the simplicity of the feedback button provides an easy, immediate, and concise method for receiving a feedback expression, it may not always be entirely sufficient to adequately capture the user sentiment in all cases.

Some embodiments may provide a drop-down box or pop-up window to provide additional information. In FIG. 10, the pop-up window 1002 may be activated when the button 100 is clicked and a feedback expression representing general unhappiness with the user experience is selected. The pop-up window 1002 may include a text box 1004 that allows the user to describe aspects of the user experience that were less than satisfactory. This allows the user to describe in greater detail aspects of the user experience that can be improved by design changes to the user interface. This type of detail can be very valuable to designers of the user interface to understand how users react to various design decisions.

While some users may wish to provide additional feedback, other users may feel that the selected feedback expression adequately captures their sentiment towards the user experience. In these cases, the pop-up window 1002 may include a button 1006 that allows the pop-up window 1002 to be dismissed. This can minimize the inconvenience to users who do not wish to provide additional feedback. The pop-up window 1002 may also include a button 1008 that allows additional feedback to be submitted. In some embodiments, the button 1008 to submit feedback may be colored or emphasized to encourage the user to provide additional information.

Although the example of FIG. 10 provides the pop-up window 1002 when the feedback expression represents a negative user experience, this is provided only by way of example and is not meant to be limiting. Some embodiments may request additional feedback for any of the selected feedback expressions. For example, some embodiments may display the pop-up window 1002 when positive feedback expressions are selected. Some embodiments may display the pop-up window 1002 when feedback expressions that deviate from common feedback expressions are received. For example, if a threshold number (e.g., 75%) of feedback expressions are positive, the pop-up window 1002 may be displayed when negative feedback expressions are received, and vice versa. This allows users to submit additional information when their experience deviates from the experience of most users.

Figure 11:
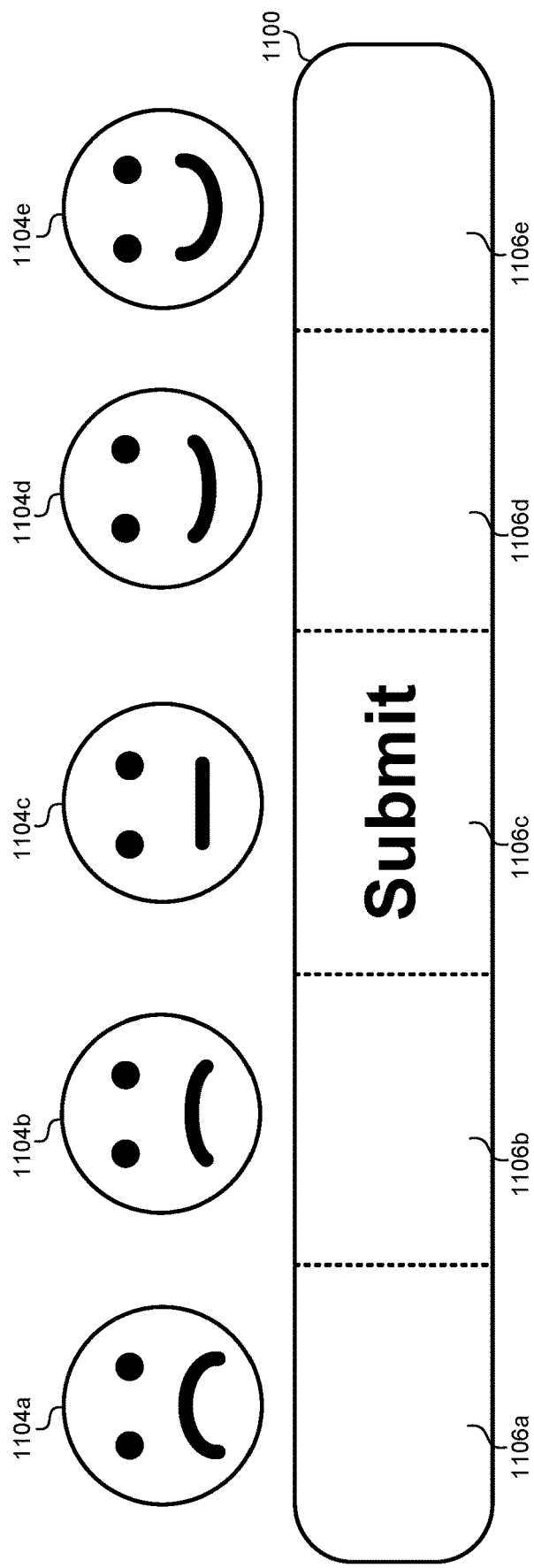
FIG. 11 illustrates a feedback button having a relatively large number of regions, according to some embodiments.

FIG. 11 illustrates a feedback button 1100 having a relatively large number of regions, according to some embodiments. The examples described above for the button 100 include three different possible feedback expressions. However, other embodiments may include any number of feedback expressions and corresponding regions in the button. The feedback button 1100 in FIG. 11 includes five different regions 1106 along with five corresponding feedback expressions. Each of these feedback expressions may include a corresponding icon 1104 that represents the corresponding feedback expression using a facial expression. These feedback expressions may include being unhappy, being somewhat unhappy, being neutral, being somewhat happy, and being happy with the user experience.

Other embodiments may include more feedback expressions than those illustrated in FIG. 11, and as described above, some embodiments may include a pseudo-continuous range of feedback expressions. For example, as a user moves the cursor back-and-forth across the length of the button 1100, a single icon 1104 may be displayed with a facial expression that changes with the position of the cursor. As the user moves the cursor farther to the left, the facial expression on the icon 1104 may gradually become more unhappy. As the user moves the cursor farther to the right, the facial expression on the icon 1104 may gradually become more happy.

Figure 12:
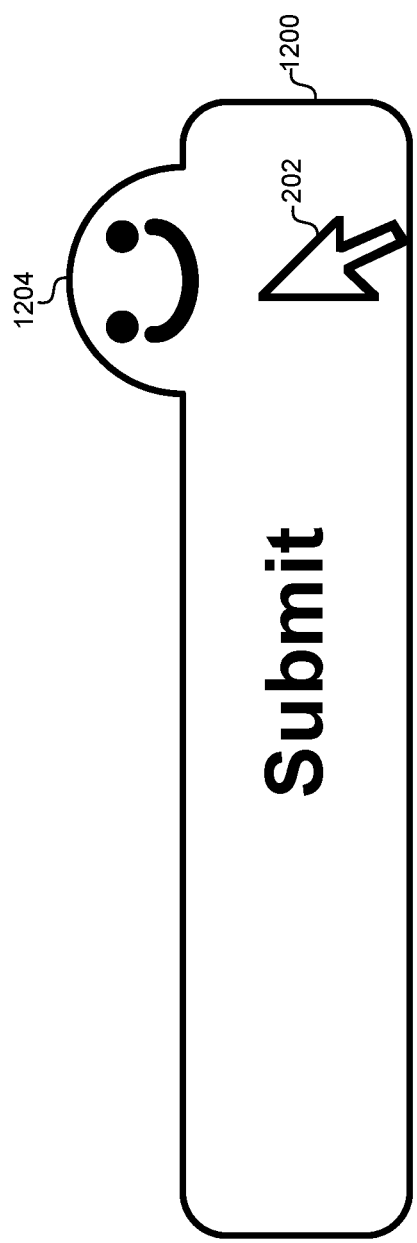
FIG. 12 illustrates an alternate view of the feedback button, according to some embodiments.

FIG. 12 illustrates an alternate view of the feedback button 1200, according to some embodiments. Instead of using icons that are graphically distinct from the button, some embodiments may integrate the display of visual indications of the feedback expression into the button itself. For example, as the user hovers the cursor 202 over the button 1200, the border of the button 1200 may "pop out" such that a facial expression 1204 appears to extrude from the button 1200. The facial expression 1204 may still appear within the border of the button 1200 as it expands outward. This embodiment provides a clean look that may prevent the user from being distracted by additional icons and/or animations.

As described for the embodiments above, the content of the facial expression 1204 may be determined by the location of the cursor 202 on the button 1200. For example, as the user moves the cursor 202 towards the left side of the button 1200, the facial expression 1204 may change from the "happy" expression shown in FIG. 12 to gradually show a more "unhappy" expression. The location of the facial expression 1204 may move with the cursor 202 such that it continuously slides along the top of the button 1200 as the cursor 202 moves along the length of the button 1200. Other embodiments may use discrete locations for different predefined facial expressions that pop up and down as the cursor 202 moves. For example, as the cursor 202 moves towards the left side of the button 1200, the facial expression 1204 may be absorbed back into the button 1200 while a more neutral facial expression may extrude from the center portion of the button 1200 to indicate the changing feedback expression.

Figure 13:
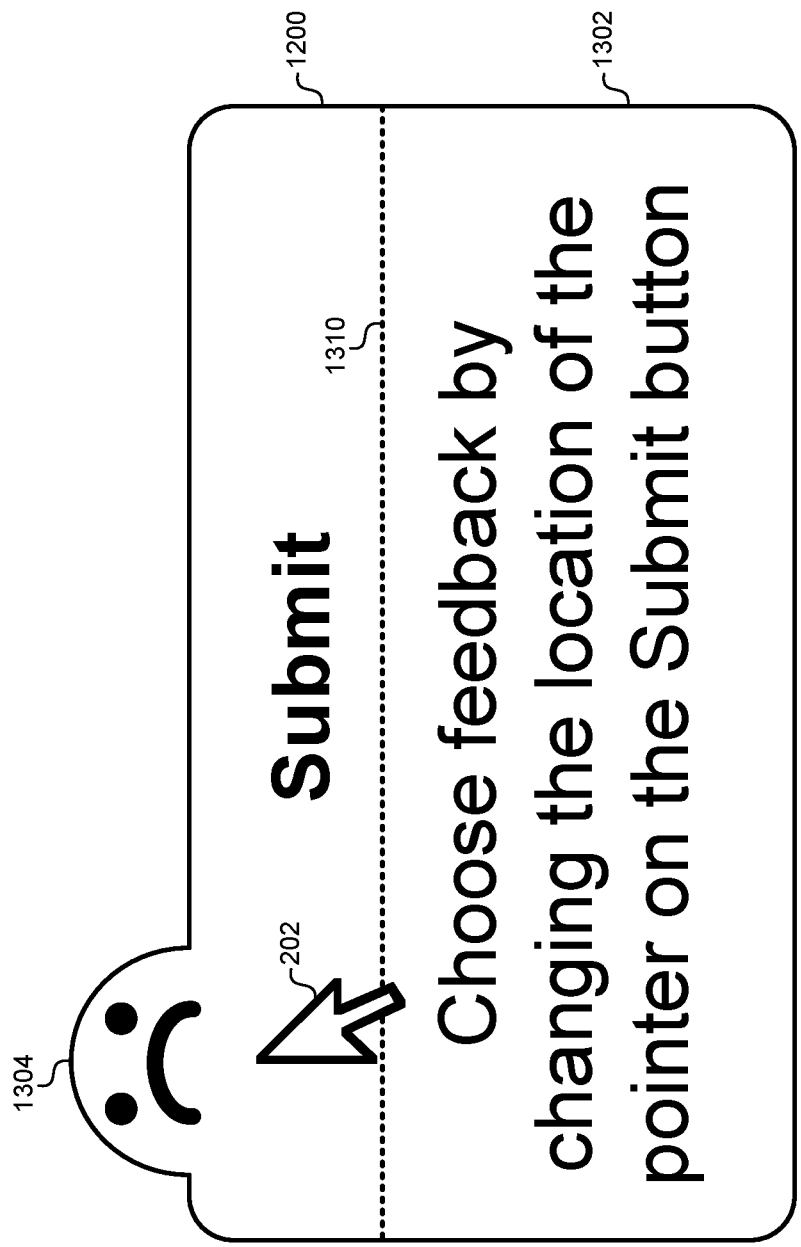
FIG. 13 illustrates an alternate view of the feedback button with a textual indicator, according to some embodiments.

FIG. 13 illustrates an alternate view of the feedback button 1200 with a textual indicator, according to some embodiments. As described above, some embodiments may include a drop-down box 1302 that describes the operation of the feedback button 1200. The first time that the user experiences the feedback button 1200, they may be unfamiliar with its operation and confused by the icons and/or other visual displays that are presented as part of its functionality. Therefore, the drop-down box 1302 may include a text description of the operation of the feedback button 1200. The drop-down box 1302 may also include a text description of the currently selected feedback expression. For example, after initially displaying the text shown in FIG. 13, the text in the drop-down box 1302 can change to describe the current feedback expression (e.g., "currently unhappy with the user experience").

In some embodiments, the border of the button 1200 may be expanded downward such that the drop-down box 1302 is an integrated part of the button 1200. The text in the drop-down box 1302 may be displayed below any text normally displayed on the button 1200 (e.g., "Submit"). Some embodiments may optionally display a line 1310 that separates the portion of the button 1200 that will normally be displayed from the text box 1302. The text box 1302 may be pulled back into the button 1200 when the button is clicked and/or during subsequent interactions with the button after the user is familiar with its operation.

Figure 14:
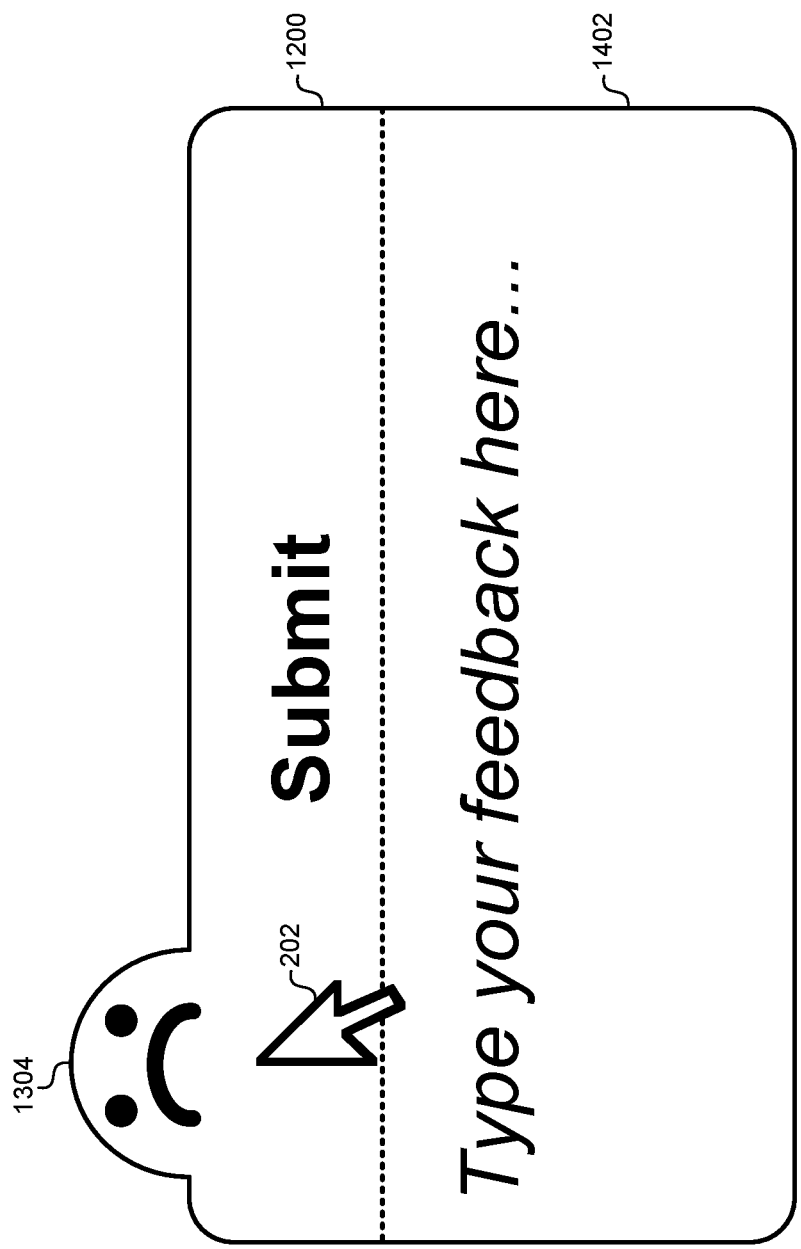
FIG. 14 illustrates a button with a drop-down box that may receive additional feedback, according to some embodiments.

FIG. 14 illustrates a button with a drop-down box 1200 that may receive additional feedback, according to some embodiments. As described above, some users may wish to provide additional feedback that provides more information regarding their user experience than can be adequately captured with the available feedback expressions. As with the drop-down box 1302 in FIG. 13, the drop-down box 1402 in FIG. 14 can be an integrated part of the button 1200. As described above, the drop-down box 1402 may be provided for negative feedback expressions, positive feedback expressions, feedback expressions that deviate from a population of received feedback expressions, and/or any other situation that may warrant additional information from the user.

Figure 15:
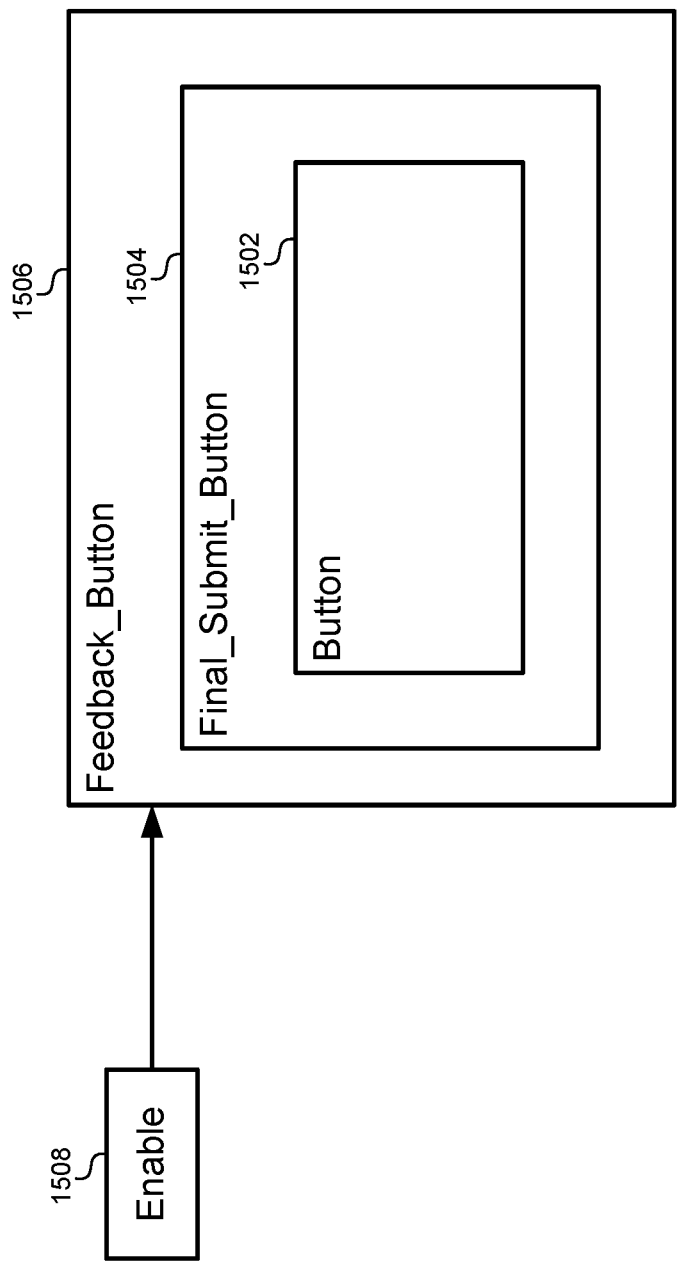
FIG. 15 illustrates a software structure for a button, according to some embodiments.

FIG. 15 illustrates a software structure for a button, according to some embodiments. In order to make the feedback button universally applicable across a large population of applications, the feedback button may be implemented as a button component that extends or inherits from a base button component used by many applications. In some embodiments, the feedback button may be deployed across large software installations, such as database systems, cloud systems, enterprise software systems, Software as a Service (SaaS) offerings, and so forth. Instead of requiring evert designer to implement the functionality of the feedback button individually, some embodiments may instead provide the feedback button as a standard component in a toolbox of components that may be used for designing web or mobile applications that can be deployed from, for example, a cloud environment.

A standard button component 1502 may be provided in a component library. The button component may include functionality that handles events such as a cursor hovering over the button, the button being activated or clicked, the button being selected, and so forth. The button component may also include functionality that controls the appearance of the button. As used herein, the button component may also include a view of the button component that controls the look-and-feel of the button. Therefore the display of the button may be referred to as a view of the button component. The code in the button component itself may be distinct from the view and may control all of the traditional button functionality users may expect to be present in a button component.

As described above, some buttons may be classified as a submit button or a final submit button. The final submit button component 1504 may be a child component of the button class 1502 may include additional functionality that causes a web form to be reset and/or information received through the interface to be submitted for processing. To implement the feedback button functionality, the button component 1502 and/or the final submit button component 1504 may be extended or inherited by a feedback button component 1506. The feedback button component 1506 may include all of the functionality of the final submit button component 1504 and/or the button component 1502 along with the additional feedback button functionality described above.

Although FIG. 15 illustrates these components as members of a hierarchy, some embodiments may simply implement the feedback button functionality in the code of the button component 1502 itself. Thus, by instantiating the button component 1502, a designer of the user interface may automatically import all of the feedback button functionality by default.

Some embodiments may include an enable input 1508 that can be used to govern the functionality of buttons in a user interface. Some interface designers may desire to only activate the functionality of the feedback button at certain times and in certain situations. For example, when the enable input 1508 is not provided, the feedback button may function and appear as a normal, traditional button component. However, when the enable input 1508 is received, the feedback button can include the additional functionality described above to receive a feedback expression.

The enable input 1508 may be provided at any level in a software architecture. For example, some embodiments may allow the enable input to be received at a global level such that all feedback buttons in a software system may activate their feedback expression capabilities. This may be useful for situations where a system may wish to globally receive feedback for particular software tools. In some embodiments, the enable input 1508 may be received more locally, such that individual installations, individual applications, or individual locations may enable the functionality of the feedback button without affecting other installations, applications, or locations.

In some embodiments, the enable input 1508 may be applied dynamically to individual applications and users. For example some embodiments may monitor time spent for a particular user in entering information and completing fields in a web form. Some embodiments may also monitor a click path of the user to monitor user activity on the webpage. If either the time spent or the behavior of the user deviate from normal user activities or timing, the enable input 1508 can be activated such that user feedback can be requested. This allows a system to dynamically identify at runtime when users may be experiencing difficulty, and confirm that difficulty using the feedback button.

In some embodiments, the enable input 1508 may be applied dynamically based on a state of the user interface. For example, the enable input 1508 may be applied temporarily when a user interface is first installed. The enable input 1508 may also be applied temporarily for a predefined time interval after an update is received for the user interface that changes its operation or its look-and-feel. This allows the software provider to evaluate changes that are made to the user interface to determine whether they are effective or whether they interfere with the user experience.

Figure 16:
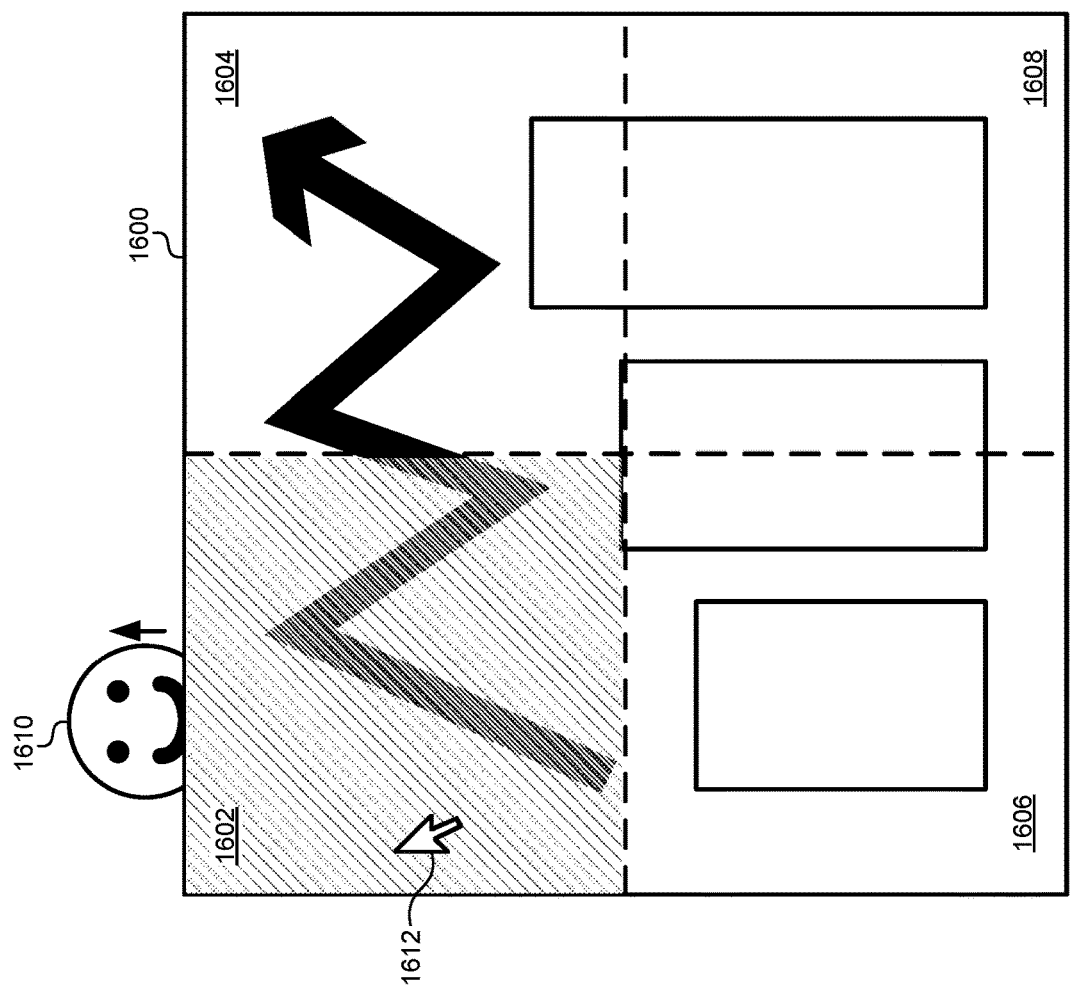
FIG. 16 illustrates a non-button component with feedback capability, according to some embodiments.

FIG. 16 illustrates a non-button component with feedback capability, according to some embodiments. Although the components described above with feedback capability have been implemented using button components, not all embodiments are so limited. In other embodiments, any component may have the feedback capability implemented as an optional part of their operation. In the example of FIG. 16, a visual component that need not necessarily receive user inputs in normal operation may be extended to include feedback capability. As described above for the button implementations, a graph 1600 component may be divided into a plurality of regions 1602, 1604, 1606, 1608. As the user moves the cursor 1612 through these various regions 1602, they may be visually highlighted by changing color, transparency, fill pattern, etc., and may include various visual indicators and/or textual indicators that a feedback expression may be selected. For example, an icon 1610 may be provided such that it "pops out" from behind the graph 1600 when the cursor 1612 hovers over a corresponding region 1602. Although not shown explicitly, the graph may also include text that is displayed describing the functionality of the feedback mechanism.

At any time, the user may provide feedback by clicking on one of the regions 1602, 1604, 1606, 1608 in the graph 1600. Instead of submitting information for processing as described above for the submit button, the graph 1600 may simply submit a feedback expression characterizing the user experience with the graph 1600. Other than the feedback expression, the display of the graph 1600 and the rest of the user interface may continue to operate as normal. In some embodiments a number of different components in the user interface may be displayed together that each include feedback capability. Users may individually select components and provide feedback expressions to characterize their user experience with each individual component.

Figure 17:
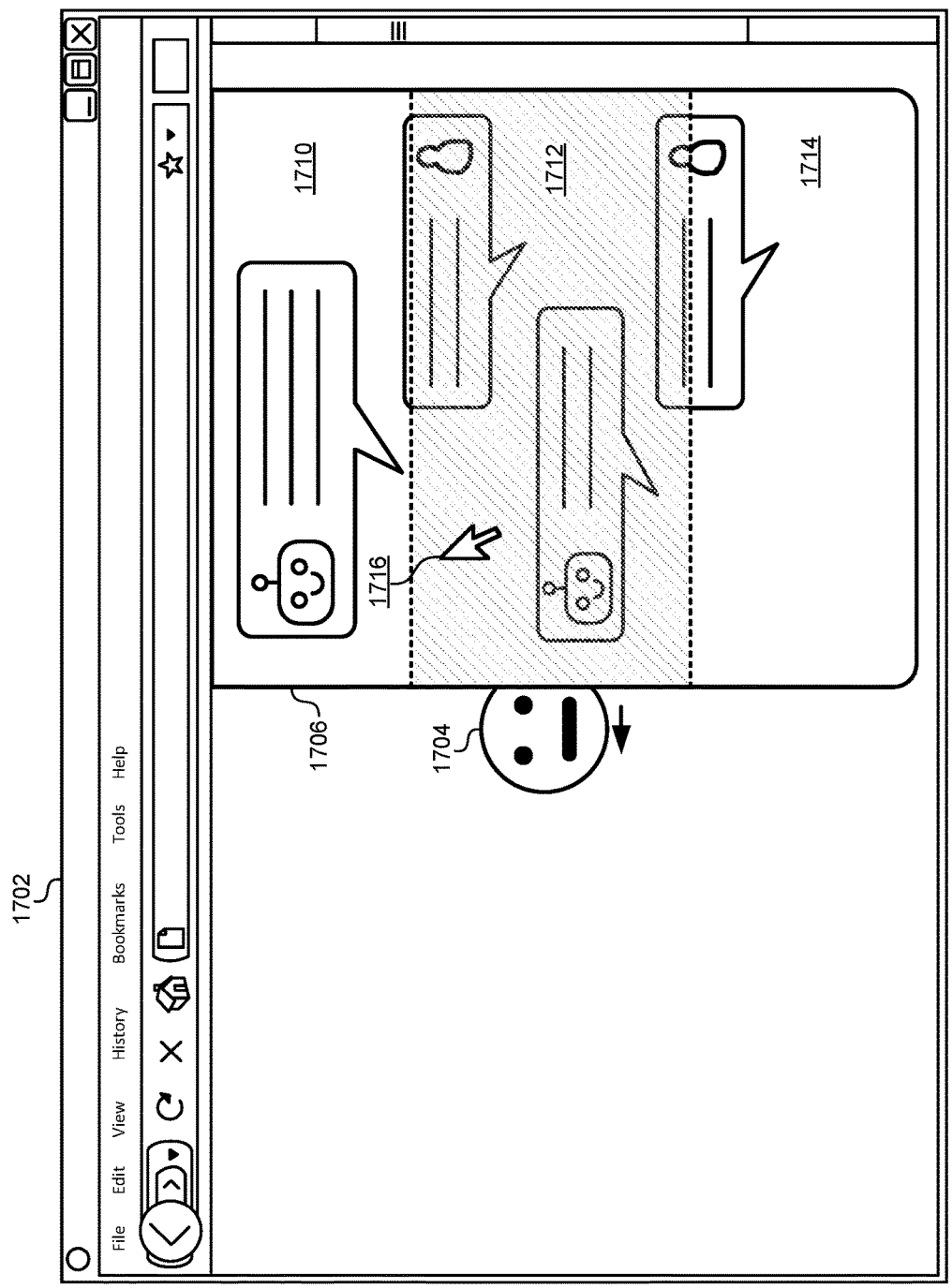
FIG. 17 illustrates a chat bot component that is modified to include feedback capability, according to some embodiments.

FIG. 17 illustrates a chat bot component that is modified to include feedback capability, according to some embodiments. As described above for the graph 1600 in FIG. 16, a chat bot component 1706 may be implemented with feedback capability in a user interface 1702. The chat bot component 1706 may include a plurality of regions 1710, 1712, 1714 that can be individually highlighted/selected by hovering the cursor over the regions 1710, 1712, 1714. An icon 1704 may be displayed in conjunction with the various regions to visually indicate a feedback expression. Although not shown explicitly, the chat bot component 1706 may also include various text displays that pop up to describe the operation of the feedback mechanism and to describe the available feedback expressions that may be selected by users. In some embodiments, the chat bot component 1706 may function normally, and a button within the chat bot component 1706 may include the feedback functionality instead of the entire chat bot component.

Figure 18:
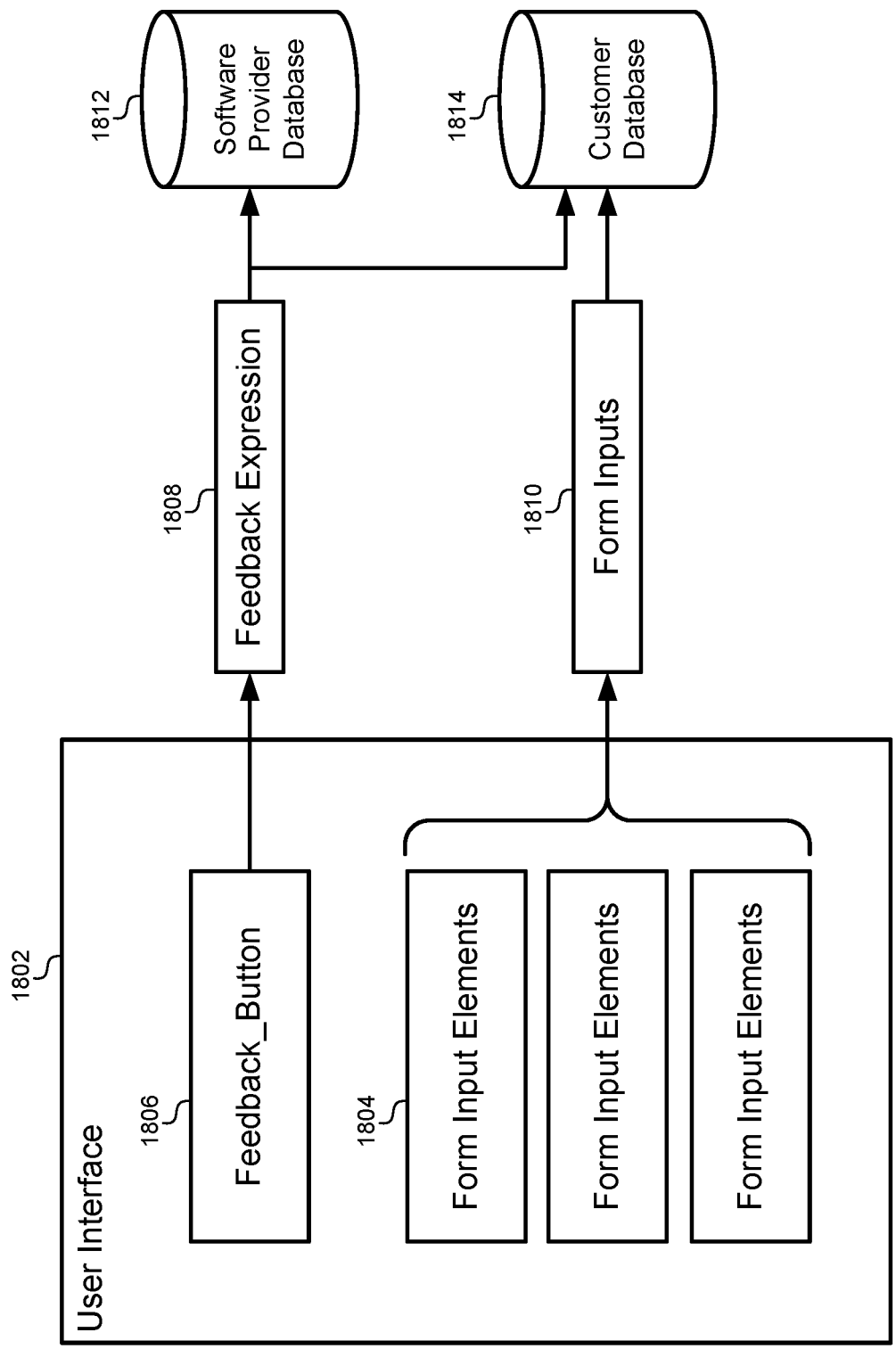
FIG. 18 illustrates a dataflow diagram for the operation of the feedback button, according to some embodiments.

FIG. 18 illustrates a dataflow diagram for the operation of the feedback button, according to some embodiments. As depicted above in FIG. 1, the user interface 1802 may include a feedback button 1806 along with additional input components 1804 that may be used to receive information from the user. When the feedback button is activated, the feedback button may cause the information provided to the input components 1804 to be provided as form inputs 1810 to a customer database 1814. Additionally, when the feedback button 1806 is activated, the feedback button 1806 may provide a feedback expression to a software provider database 1812.

These outputs from the user interface 1802 may be separately routed and processed because they may be of interest to different entities. For example, the customer (e.g., the entity executing the user interface 1802 and receiving inputs from clients processing transactions) may be uniquely interested in the inputs received from the user interface 1812 from clients. However, a software provider (e.g., the entity providing the software to the customer) may be uniquely interested in user feedback regarding the operation of the software. Therefore, the feedback expressions 1808 can be routed to the software provider database 1812, and the form inputs 1810 may be routed to the customer database 1814. In some embodiments, these two data sets may be kept separate from each other such that the customer does not have access to the feedback expressions and/or the software provider does not have access to the form inputs. In other embodiments, the customer may have interest in the feedback expressions 1808, and thus they may be routed to both the customer database 1814 and the software provider database 1812.

Figure 19:
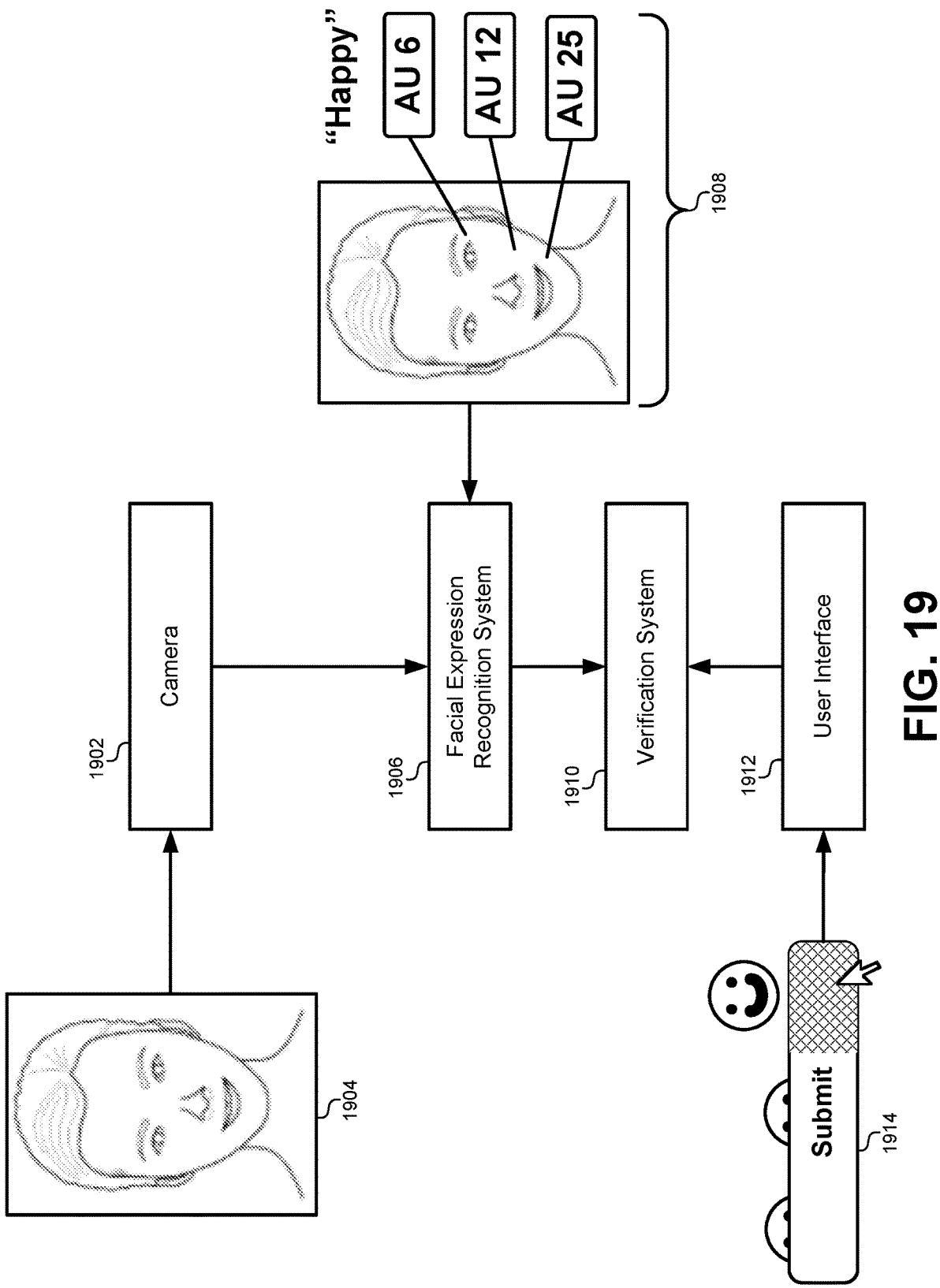
FIG. 19 illustrates a method of testing the accuracy of the feedback expressions received through the user interface, according to some embodiments.

FIG. 19 illustrates a method of testing the accuracy of the feedback expressions received through the user interface, according to some embodiments. The accuracy of the feedback expressions depends on whether a user honestly and/or accurately selected a feedback expression that represented their actual user experience. To evaluate the accuracy of the feedback mechanism, some embodiments may include a camera 1902 that captures an image 1904 of a user. The camera 1902 may include a WebCam or an integrated camera in a computing system, such as an integrated camera in a tablet computer, a laptop computer, a smart phone, and so forth.

The system may also include a facial recognition system that is able to detect certain facial features in the image 1904 and determine a user emotion. For example, some embodiments may use the Noldus® FaceReader™ software to analyze the image 1904 and extract a facial expression 1908 that can be used to characterize how a user feels using the user interface. Other embodiments may use any other facial expression analysis tool without limitation.

The system may also include a feedback button 1914 as described above as part of user interface 1912 that provides a selected feedback expression from the user. A verification system 1910 can then analyze and compare the facial expression 1908 and the emotion represented by the facial expression 1908 with the selected feedback expression and the emotion represented by the feedback expression. By comparing the self-reported emotion through the recorded feedback expression and the measured emotion through the facial expression, the system can determine how accurately the feedback button is capturing true user sentiment towards the user interface.

This can be used to generate an accuracy metric that can drive the design of the feedback button itself. For example, if it is determined that the feedback button causes a negative emotion to be displayed in the facial expression 1908, the feedback button 1914 can be designed to be less overt and more subtle. If the feedback button itself does not cause a negative emotion, but does not accurately capture the emotion displayed in the facial expression 1908, the feedback button can be designed to provide more options for selecting a feedback expression.

Figure 20:
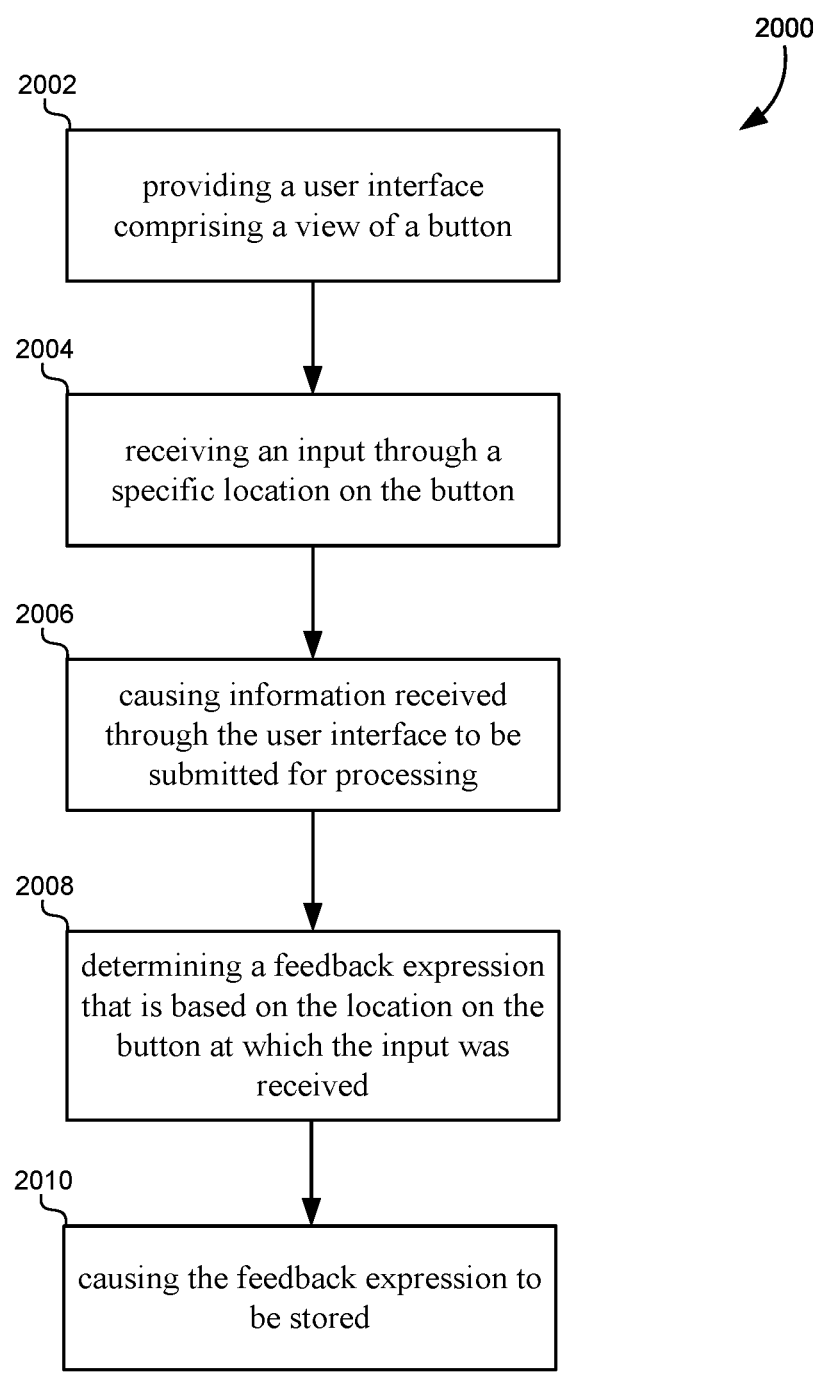
FIG. 20 illustrates a flowchart of a method for collecting user feedback through a user interface component, according to some embodiments.

FIG. 20 illustrates a flowchart of a method for collecting user feedback through a user interface component, according to some embodiments. The method may include providing a user interface comprising a view of a button (2002). In some embodiments, the view of the button may include a plurality of regions which may or may not be visible to the user. Each of the regions may be associated with individual feedback expressions. Each of the regions may also be associated with a corresponding icon representing the feedback expression and/or textual descriptions of the feedback expressions. When hovering over the button, the icons and/or textual descriptions may be displayed to help the user understand the meaning of the feedback expression that may be selected. Hovering over the regions may cause the visual appearance of the region to also be altered. The button may include a button component that is altered to include the feedback capability described above. The user interface may include a plurality of additional fields that receive user information for processing a transaction. The button may be a submit button that causes the information to be submitted for processing.

The method may also include receiving an input through the button, where the input is received at a location on the button (2004). The input may include a button click, a finger tap, and/or any other input method. The location at which the input is received may be within one of the plurality of regions described above. The method may also include causing information received through the user interface to be submitted for processing (2006). This information may include information for completing or storing a transaction or other data record provided by the user. This action may cause the information to be finally submitted for processing by a server-side application.

The method may further include determining a feedback expression that is based on the location on the button at which the input was received (2008). The feedback expression may be determined based on a region in which the input was received. The feedback expression may also be determined based on a location in the button relative to a dimension of the button, such as a cursor being a certain percentage along a horizontal dimension of the button. The feedback expression may represent a user's feeling towards the user experience with the user interface.

The method may also include causing the feedback expression to be stored (2010). The feedback expression may be stored and processed separately from the information submitted for processing through the user interface. The feedback expression may be used by a software provider to evaluate changes made to the user interface. The feedback expression may also be used by a software provider to evaluate changes made to a user interface. This allows for long-term tracking and evaluation of how users respond to changes over the lifecycle of a software product.

It should be appreciated that the specific steps illustrated in FIG. 20 provide particular methods of operating a feedback button according to various embodiments of the present invention. Other sequences of steps may also be performed according to alternative embodiments. For example, alternative embodiments of the present invention may perform the steps outlined above in a different order. Moreover, the individual steps illustrated in FIG. 20 may include multiple sub-steps that may be performed in various sequences as appropriate to the individual step. Furthermore, additional steps may be added or removed depending on the particular applications. One of ordinary skill in the art would recognize many variations, modifications, and alternatives.

Each of the methods described herein may be implemented by a computer system. Each step of these methods may be executed automatically by the computer system, and/or may be provided with inputs/outputs involving a user. For example, a user may provide inputs for each step in a method, and each of these inputs may be in response to a specific output requesting such an input, wherein the output is generated by the computer system. Each input may be received in response to a corresponding requesting output. Furthermore, inputs may be received from a user, from another computer system as a data stream, retrieved from a memory location, retrieved over a network, requested from a web service, and/or the like. Likewise, outputs may be provided to a user, to another computer system as a data stream, saved in a memory location, sent over a network, provided to a web service, and/or the like. In short, each step of the methods described herein may be performed by a computer system, and may involve any number of inputs, outputs, and/or requests to and from the computer system which may or may not involve a user. Those steps not involving a user may be said to be performed automatically by the computer system without human intervention. Therefore, it will be understood in light of this disclosure, that each step of each method described herein may be altered to include an input and output to and from a user, or may be done automatically by a computer system without human intervention where any determinations are made by a processor. Furthermore, some embodiments of each of the methods described herein may be implemented as a set of instructions stored on a tangible, non-transitory storage medium to form a tangible software product.

Figure 21:
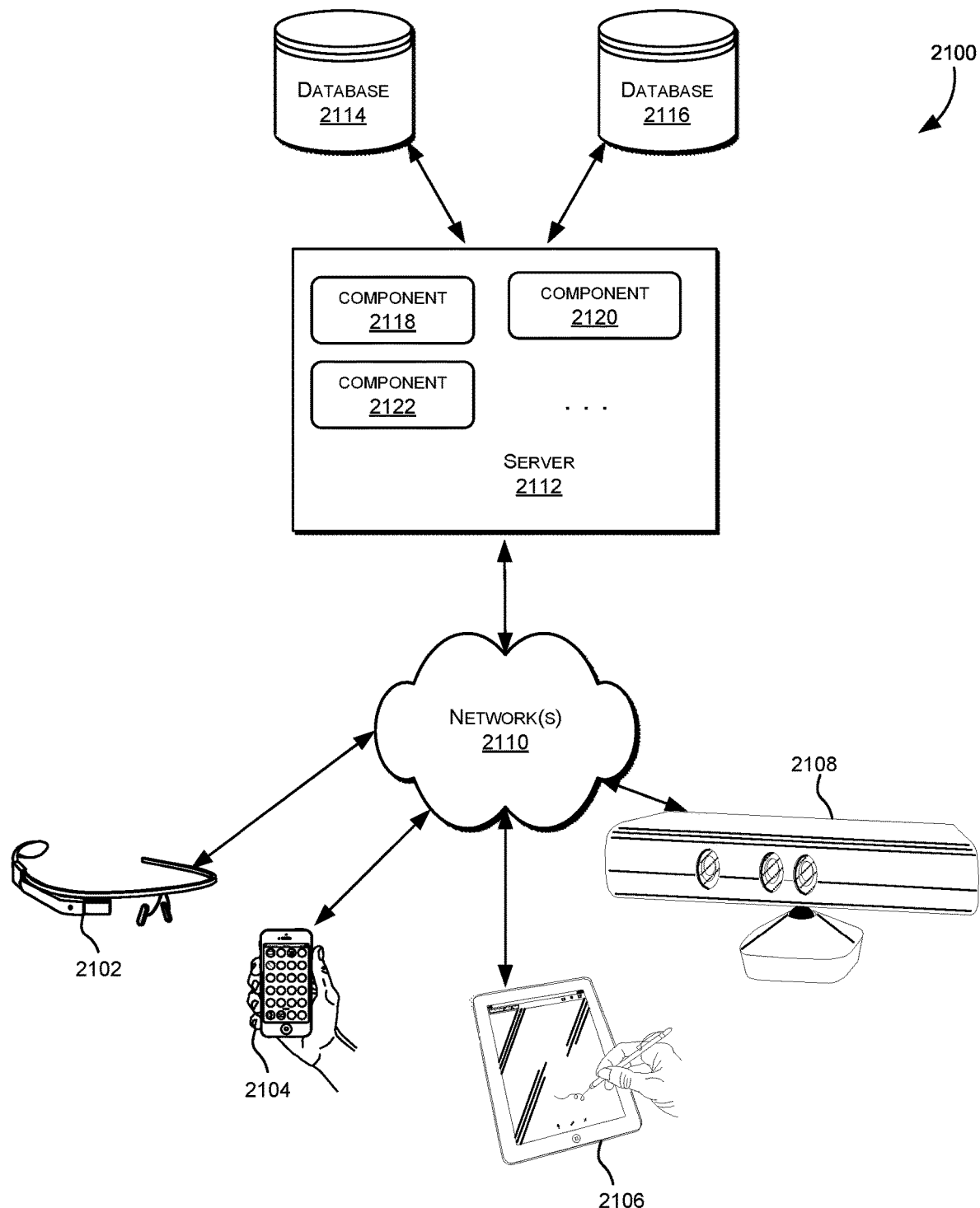
FIG. 21 illustrates a simplified block diagram of a distributed system for implementing some of the embodiments.

FIG. 21 depicts a simplified diagram of a distributed system 2100 for implementing some of the embodiments. In the illustrated embodiment, distributed system 2100 includes one or more client computing devices 2102, 2104, 2106, and 2108, which are configured to execute and operate a client application such as a web browser, proprietary client (e.g., Oracle Forms), or the like over one or more network(s) 2110. Server 2112 may be communicatively coupled with remote client computing devices 2102, 2104, 2106, and 2108 via network 2110.

In various embodiments, server 2112 may be adapted to run one or more services or software applications provided by one or more of the components of the system. In some embodiments, these services may be offered as web-based or cloud services or under a Software as a Service (SaaS) model to the users of client computing devices 2102, 2104, 2106, and/or 2108. Users operating client computing devices 2102, 2104, 2106, and/or 2108 may in turn utilize one or more client applications to interact with server 2112 to utilize the services provided by these components.

In the configuration depicted in the figure, the software components 2118, 2120 and 2122 of system 2100 are shown as being implemented on server 2112. In other embodiments, one or more of the components of system 2100 and/or the services provided by these components may also be implemented by one or more of the client computing devices 2102, 2104, 2106, and/or 2108. Users operating the client computing devices may then utilize one or more client applications to use the services provided by these components. These components may be implemented in hardware, firmware, software, or combinations thereof. It should be appreciated that various different system configurations are possible, which may be different from distributed system 2100. The embodiment shown in the figure is thus one example of a distributed system for implementing an embodiment system and is not intended to be limiting.

Client computing devices 2102, 2104, 2106, and/or 2108 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like, and being Internet, e-mail, short message service (SMS), Blackberry®, or other communication protocol enabled. The client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices 2102, 2104, 2106, and 2108 may be any other electronic device, such as a thin-client computer, an Internet-enabled gaming system (e.g., a Microsoft Xbox gaming console with or without a Kinect® gesture input device), and/or a personal messaging device, capable of communicating over network(s) 2110.

Although exemplary distributed system 2100 is shown with four client computing devices, any number of client computing devices may be supported. Other devices, such as devices with sensors, etc., may interact with server 2112.

Network(s) 2110 in distributed system 2100 may be any type of network familiar to those skilled in the art that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 2110 can be a local area network (LAN), such as one based on Ethernet, Token-Ring and/or the like. Network(s) 2110 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol); and/or any combination of these and/or other networks.

Server 2112 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. In various embodiments, server 2112 may be adapted to run one or more services or software applications described in the foregoing disclosure. For example, server 2112 may correspond to a server for performing processing described above according to an embodiment of the present disclosure.

Server 2112 may run an operating system including any of those discussed above, as well as any commercially available server operating system. Server 2112 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 2112 may include one or more applications to analyze and consolidate data feeds and/or event updates received from users of client computing devices 2102, 2104, 2106, and 2108. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 2112 may also include one or more applications to display the data feeds and/or real-time events via one or more display devices of client computing devices 2102, 2104, 2106, and 2108.

Distributed system 2100 may also include one or more databases 2114 and 2116. Databases 2114 and 2116 may reside in a variety of locations. By way of example, one or more of databases 2114 and 2116 may reside on a non-transitory storage medium local to (and/or resident in) server 2112. Alternatively, databases 2114 and 2116 may be remote from server 2112 and in communication with server 2112 via a network-based or dedicated connection. In one set of embodiments, databases 2114 and 2116 may reside in a storage-area network (SAN). Similarly, any necessary files for performing the functions attributed to server 2112 may be stored locally on server 2112 and/or remotely, as appropriate. In one set of embodiments, databases 2114 and 2116 may include relational databases, such as databases provided by Oracle, that are adapted to store, update, and retrieve data in response to SQL-formatted commands.

Figure 22:
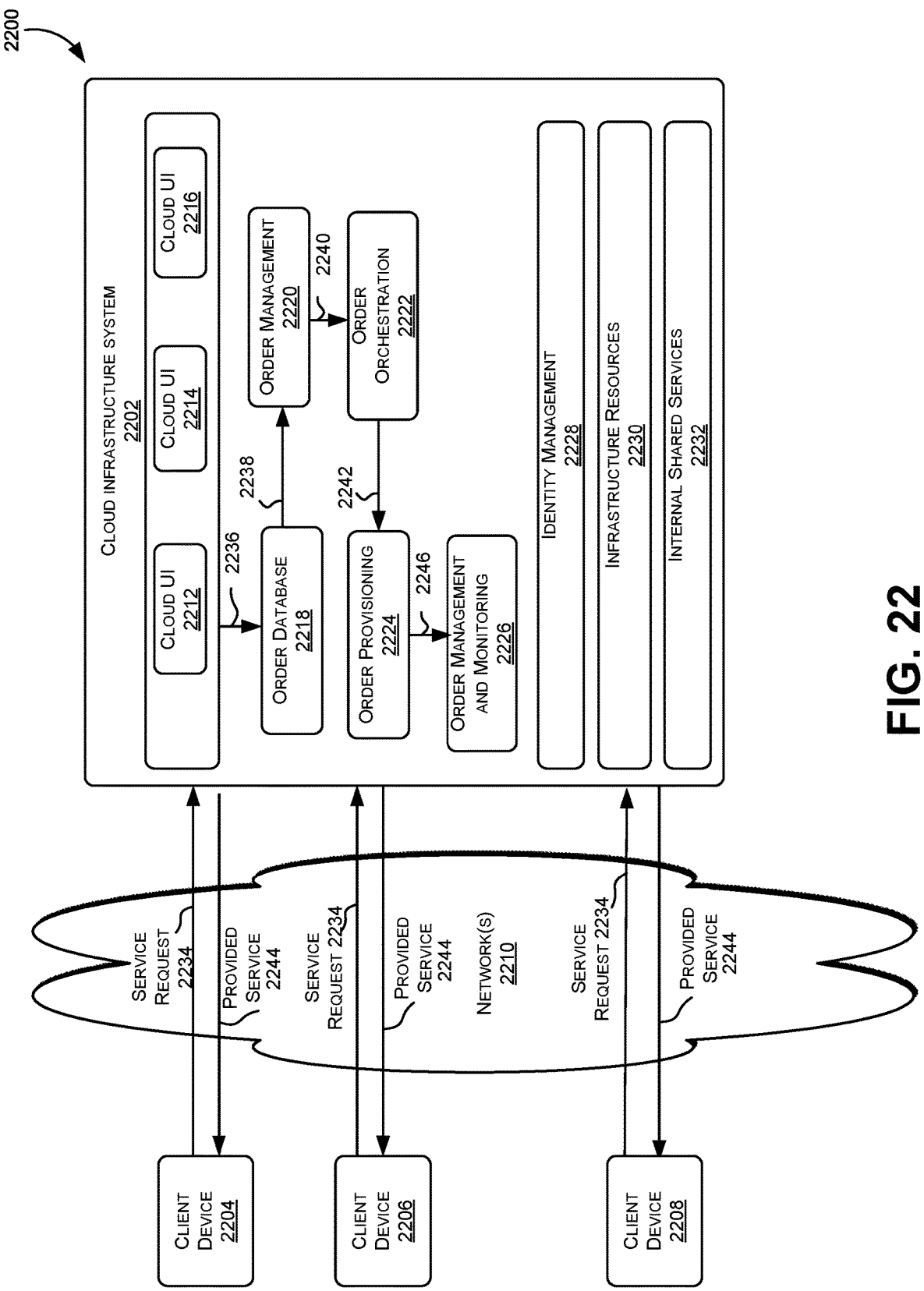
FIG. 22 illustrates a simplified block diagram of components of a system environment by which services provided by the components of an embodiment system may be offered as cloud services.

FIG. 22 is a simplified block diagram of one or more components of a system environment 2200 by which services provided by one or more components of an embodiment system may be offered as cloud services, in accordance with an embodiment of the present disclosure. In the illustrated embodiment, system environment 2200 includes one or more client computing devices 2204, 2206, and 2208 that may be used by users to interact with a cloud infrastructure system 2202 that provides cloud services. The client computing devices may be configured to operate a client application such as a web browser, a proprietary client application (e.g., Oracle Forms), or some other application, which may be used by a user of the client computing device to interact with cloud infrastructure system 2202 to use services provided by cloud infrastructure system 2202.

It should be appreciated that cloud infrastructure system 2202 depicted in the figure may have other components than those depicted. Further, the embodiment shown in the figure is only one example of a cloud infrastructure system that may incorporate an embodiment of the invention. In some other embodiments, cloud infrastructure system 2202 may have more or fewer components than shown in the figure, may combine two or more components, or may have a different configuration or arrangement of components.

Client computing devices 2204, 2206, and 2208 may be devices similar to those described above for 2102, 2104, 2106, and 2108.

Although exemplary system environment 2200 is shown with three client computing devices, any number of client computing devices may be supported. Other devices such as devices with sensors, etc. may interact with cloud infrastructure system 2202.

Network(s) 2210 may facilitate communications and exchange of data between clients 2204, 2206, and 2208 and cloud infrastructure system 2202. Each network may be any type of network familiar to those skilled in the art that can support data communications using any of a variety of commercially-available protocols, including those described above for network(s) 2110.

Cloud infrastructure system 2202 may comprise one or more computers and/or servers that may include those described above for server 2112.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 2202 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

In various embodiments, cloud infrastructure system 2202 may be adapted to automatically provision, manage and track a customer's subscription to services offered by cloud infrastructure system 2202. Cloud infrastructure system 2202 may provide the cloud services via different deployment models. For example, services may be provided under a public cloud model in which cloud infrastructure system 2202 is owned by an organization selling cloud services (e.g., owned by Oracle) and the services are made available to the general public or different industry enterprises. As another example, services may be provided under a private cloud model in which cloud infrastructure system 2202 is operated solely for a single organization and may provide services for one or more entities within the organization. The cloud services may also be provided under a community cloud model in which cloud infrastructure system 2202 and the services provided by cloud infrastructure system 2202 are shared by several organizations in a related community. The cloud services may also be provided under a hybrid cloud model, which is a combination of two or more different models.

In some embodiments, the services provided by cloud infrastructure system 2202 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 2202. Cloud infrastructure system 2202 then performs processing to provide the services in the customer's subscription order.

In some embodiments, the services provided by cloud infrastructure system 2202 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 2202 may also include infrastructure resources 2230 for providing the resources used to provide various services to customers of the cloud infrastructure system. In one embodiment, infrastructure resources 2230 may include pre-integrated and optimized combinations of hardware, such as servers, storage, and networking resources to execute the services provided by the PaaS platform and the SaaS platform.

In some embodiments, resources in cloud infrastructure system 2202 may be shared by multiple users and dynamically re-allocated per demand. Additionally, resources may be allocated to users in different time zones. For example, cloud infrastructure system 2230 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 2232 may be provided that are shared by different components or modules of cloud infrastructure system 2202 and by the services provided by cloud infrastructure system 2202. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 2202 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 2202, and the like.

In one embodiment, as depicted in the figure, cloud management functionality may be provided by one or more modules, such as an order management module 2220, an order orchestration module 2222, an order provisioning module 2224, an order management and monitoring module 2226, and an identity management module 2228. These modules may include or be provided using one or more computers and/or servers, which may be general purpose computers, specialized server computers, server farms, server clusters, or any other appropriate arrangement and/or combination.

In exemplary operation 2234, a customer using a client device, such as client device 2204, 2206 or 2208, may interact with cloud infrastructure system 2202 by requesting one or more services provided by cloud infrastructure system 2202 and placing an order for a subscription for one or more services offered by cloud infrastructure system 2202. In certain embodiments, the customer may access a cloud User Interface (UI), cloud UI 2212, cloud UI 2214 and/or cloud UI 2216 and place a subscription order via these UIs. The order information received by cloud infrastructure system 2202 in response to the customer placing an order may include information identifying the customer and one or more services offered by the cloud infrastructure system 2202 that the customer intends to subscribe to.

After an order has been placed by the customer, the order information is received via the cloud UIs, 2212, 2214 and/or 2216.

At operation 2236, the order is stored in order database 2218. Order database 2218 can be one of several databases operated by cloud infrastructure system 2218 and operated in conjunction with other system elements.

At operation 2238, the order information is forwarded to an order management module 2220. In some instances, order management module 2220 may be configured to perform billing and accounting functions related to the order, such as verifying the order, and upon verification, booking the order.

At operation 2240, information regarding the order is communicated to an order orchestration module 2222. Order orchestration module 2222 may utilize the order information to orchestrate the provisioning of services and resources for the order placed by the customer. In some instances, order orchestration module 2222 may orchestrate the provisioning of resources to support the subscribed services using the services of order provisioning module 2224.

In certain embodiments, order orchestration module 2222 enables the management of business processes associated with each order and applies business logic to determine whether an order should proceed to provisioning. At operation 2242, upon receiving an order for a new subscription, order orchestration module 2222 sends a request to order provisioning module 2224 to allocate resources and configure those resources needed to fulfill the subscription order. Order provisioning module 2224 enables the allocation of resources for the services ordered by the customer. Order provisioning module 2224 provides a level of abstraction between the cloud services provided by cloud infrastructure system 2200 and the physical implementation layer that is used to provision the resources for providing the requested services. Order orchestration module 2222 may thus be isolated from implementation details, such as whether or not services and resources are actually provisioned on the fly or pre-provisioned and only allocated/assigned upon request.

At operation 2244, once the services and resources are provisioned, a notification of the provided service may be sent to customers on client devices 2204, 2206 and/or 2208 by order provisioning module 2224 of cloud infrastructure system 2202.

At operation 2246, the customer's subscription order may be managed and tracked by an order management and monitoring module 2226. In some instances, order management and monitoring module 2226 may be configured to collect usage statistics for the services in the subscription order, such as the amount of storage used, the amount data transferred, the number of users, and the amount of system up time and system down time.

In certain embodiments, cloud infrastructure system 2200 may include an identity management module 2228. Identity management module 2228 may be configured to provide identity services, such as access management and authorization services in cloud infrastructure system 2200. In some embodiments, identity management module 2228 may control information about customers who wish to utilize the services provided by cloud infrastructure system 2202. Such information can include information that authenticates the identities of such customers and information that describes which actions those customers are authorized to perform relative to various system resources (e.g., files, directories, applications, communication ports, memory segments, etc.) Identity management module 2228 may also include the management of descriptive information about each customer and about how and by whom that descriptive information can be accessed and modified.

Figure 23:
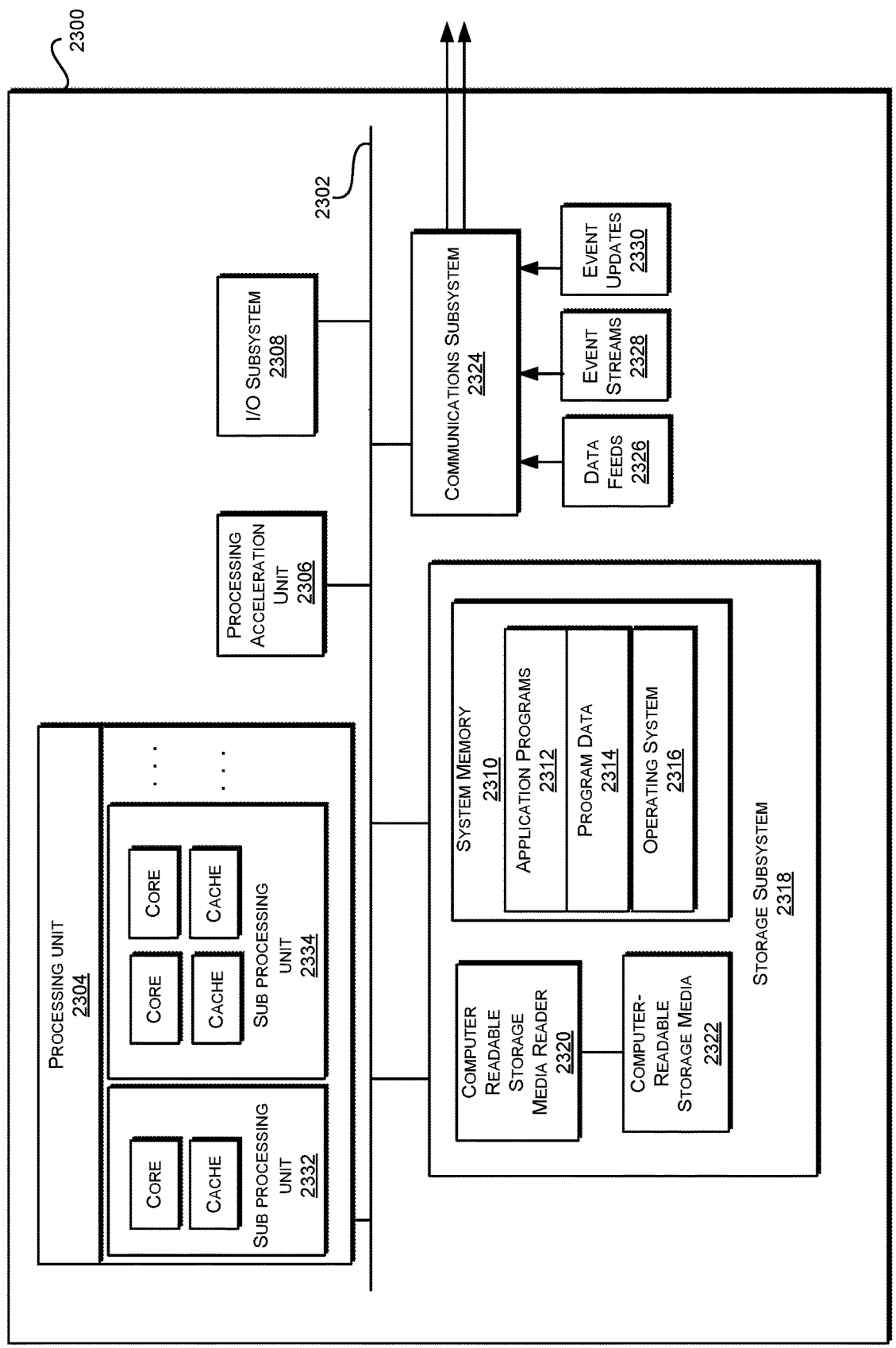
FIG. 23 illustrates an exemplary computer system, in which various embodiments may be implemented.

FIG. 23 illustrates an exemplary computer system 2300, in which various embodiments of the present invention may be implemented. The system 2300 may be used to implement any of the computer systems described above. As shown in the figure, computer system 2300 includes a processing unit 2304 that communicates with a number of peripheral subsystems via a bus subsystem 2302. These peripheral subsystems may include a processing acceleration unit 2306, an I/O subsystem 2308, a storage subsystem 2318 and a communications subsystem 2324. Storage subsystem 2318 includes tangible computer-readable storage media 2322 and a system memory 2310.

Bus subsystem 2302 provides a mechanism for letting the various components and subsystems of computer system 2300 communicate with each other as intended. Although bus subsystem 2302 is shown schematically as a single bus, alternative embodiments of the bus subsystem may utilize multiple buses. Bus subsystem 2302 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 2304, which can be implemented as one or more integrated circuits (e.g., a conventional microprocessor or microcontroller), controls the operation of computer system 2300. One or more processors may be included in processing unit 2304. These processors may include single core or multicore processors. In certain embodiments, processing unit 2304 may be implemented as one or more independent processing units 2332 and/or 2334 with single or multicore processors included in each processing unit. In other embodiments, processing unit 2304 may also be implemented as a quad-core processing unit formed by integrating two dual-core processors into a single chip.

In various embodiments, processing unit 2304 can execute a variety of programs in response to program code and can maintain multiple concurrently executing programs or processes. At any given time, some or all of the program code to be executed can be resident in processor(s) 2304 and/or in storage subsystem 2318. Through suitable programming, processor(s) 2304 can provide various functionalities described above. Computer system 2300 may additionally include a processing acceleration unit 2306, which can include a digital signal processor (DSP), a special-purpose processor, and/or the like.

I/O subsystem 2308 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 2300 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 2300 may comprise a storage subsystem 2318 that comprises software elements, shown as being currently located within a system memory 2310. System memory 2310 may store program instructions that are loadable and executable on processing unit 2304, as well as data generated during the execution of these programs.

Depending on the configuration and type of computer system 2300, system memory 2310 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 2304. In some implementations, system memory 2310 may include multiple different types of memory, such as static random access memory (SRAM) or dynamic random access memory (DRAM). In some implementations, a basic input/output system (BIOS), containing the basic routines that help to transfer information between elements within computer system 2300, such as during start-up, may typically be stored in the ROM. By way of example, and not limitation, system memory 2310 also illustrates application programs 2312, which may include client applications, Web browsers, mid-tier applications, relational database management systems (RDBMS), etc., program data 2314, and an operating system 2316. By way of example, operating system 2316 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 2318 may also provide a tangible computer-readable storage medium for storing the basic programming and data constructs that provide the functionality of some embodiments. Software (programs, code modules, instructions) that when executed by a processor provide the functionality described above may be stored in storage subsystem 2318. These software modules or instructions may be executed by processing unit 2304. Storage subsystem 2318 may also provide a repository for storing data used in accordance with the present invention.

Storage subsystem 2300 may also include a computer-readable storage media reader 2320 that can further be connected to computer-readable storage media 2322. Together and, optionally, in combination with system memory 2310, computer-readable storage media 2322 may comprehensively represent remote, local, fixed, and/or removable storage devices plus storage media for temporarily and/or more permanently containing, storing, transmitting, and retrieving computer-readable information.

Computer-readable storage media 2322 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 2300.

By way of example, computer-readable storage media 2322 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 2322 may include, but is not limited to, Zip® drives, flash memory cards, universal serial bus (USB) flash drives, secure digital (SD) cards, DVD disks, digital video tape, and the like. Computer-readable storage media 2322 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 2300.

Communications subsystem 2324 provides an interface to other computer systems and networks. Communications subsystem 2324 serves as an interface for receiving data from and transmitting data to other systems from computer system 2300. For example, communications subsystem 2324 may enable computer system 2300 to connect to one or more devices via the Internet. In some embodiments communications subsystem 2324 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 2324 can provide wired network connectivity (e.g., Ethernet) in addition to or instead of a wireless interface.

In some embodiments, communications subsystem 2324 may also receive input communication in the form of structured and/or unstructured data feeds 2326, event streams 2328, event updates 2330, and the like on behalf of one or more users who may use computer system 2300.

By way of example, communications subsystem 2324 may be configured to receive data feeds 2326 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 2324 may also be configured to receive data in the form of continuous data streams, which may include event streams 2328 of real-time events and/or event updates 2330, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 2324 may also be configured to output the structured and/or unstructured data feeds 2326, event streams 2328, event updates 2330, and the like to one or more databases that may be in communication with one or more streaming data source computers coupled to computer system 2300.

Computer system 2300 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 2300 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

In the foregoing description, for the purposes of explanation, numerous specific details were set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

The foregoing description provides exemplary embodiments only, and is not intended to limit the scope, applicability, or configuration of the disclosure. Rather, the foregoing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the foregoing description to provide a thorough understanding of the embodiments. However, it will be understood by one of ordinary skill in the art that the embodiments may be practiced without these specific details. For example, circuits, systems, networks, processes, and other components may have been shown as components in block diagram form in order not to obscure the embodiments in unnecessary detail. In other instances, well-known circuits, processes, algorithms, structures, and techniques may have been shown without unnecessary detail in order to avoid obscuring the embodiments.

Also, it is noted that individual embodiments may have been described as a process which is depicted as a flowchart, a flow diagram, a data flow diagram, a structure diagram, or a block diagram. Although a flowchart may have described the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to portable or fixed storage devices, optical storage devices, wireless channels and various other mediums capable of storing, containing, or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

In the foregoing specification, aspects of the invention are described with reference to specific embodiments thereof, but those skilled in the art will recognize that the invention is not limited thereto. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive.

Additionally, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

What is claimed is:

1. A non-transitory computer-readable medium comprising instructions that, when executed by one or more processors, causes the one or more processors to perform operations comprising:
   providing a user interface comprising a view of a button, wherein the view of the button comprises a plurality of regions, and the plurality of regions are associated with icons representing feedback expressions;
   causing the icons representing the feedback expressions to be displayed through animations as an input indicator hovers over corresponding regions in the plurality of regions;
   receiving an input through the button, wherein the input is received at a location on the button;
   in response to receiving the input through the button, determining a feedback expression in the feedback expressions that is based on the location on the button at which the input was received; and
   causing the feedback expression to be stored.

2. The non-transitory computer-readable medium of claim 1, wherein the operations further comprise, in response to receiving the input through the button, causing information received through the user interface to be submitted for processing.

3. The non-transitory computer-readable medium of claim 1, wherein the plurality of regions are not visible in the view of the button as displayed on a display device when not receiving inputs through the user interface.

4. The non-transitory computer-readable medium of claim 1, wherein the animations comprise the icons individually being revealed from behind the view of the button as the input indicator hovers over the corresponding regions.

5. The non-transitory computer-readable medium of claim 4, wherein the animations further comprise hiding one icon behind the view of the button as another icon is revealed from behind the view of the button.

6. The non-transitory computer-readable medium of claim 1, wherein the icons visually depict an emotion related to the corresponding feedback expressions.

7. The non-transitory computer-readable medium of claim 1, wherein the operations further comprise:
   causing text to be displayed that describes a feedback expression associated with the region in response to determining that the input hovers over the region.

8. The non-transitory computer-readable medium of claim 1, wherein the operations further comprise:
   causing a visual characteristic of the region to change in response to determining that the input hovers over the region.

9. The non-transitory computer-readable medium of claim 1, wherein the input comprises a mouse click or a finger tap.

10. The non-transitory computer-readable medium of claim 1, wherein the location on the button comprises a coordinate on the button where the input is received relative to a boundary or dimension of the button.

11. The non-transitory computer-readable medium of claim 2, wherein the button comprises a submit button that causes the information received through the user interface to be submitted for processing to complete a transaction to be committed to a database.

12. The non-transitory computer-readable medium of claim 11, wherein the information received through the user interface is received through components instantiated in the user interface that are distinct from the button.

13. The non-transitory computer-readable medium of claim 1, wherein the user interface further comprises a region around the view of the button, wherein the region is larger than the view of the button.

14. The non-transitory computer-readable medium of claim 13, wherein the operations further comprise:
   determining that an input indicator has entered the region; and
   causing text to be displayed in the user interface that describes a feedback functionality of the button in response to determining that the input indicator has entered the region.

15. The non-transitory computer-readable medium of claim 14, wherein the operations further comprise:
   causing one or more icons to be displayed in the user interface that depict selectable feedback expressions in response to determining that the input indicator has entered the region.

16. The non-transitory computer-readable medium of claim 1, wherein the feedback expression represents a characterization of a user experience with the user interface.

17. The non-transitory computer-readable medium of claim 1, wherein the operations further comprise:
   determining that the feedback expression represents a negative user experience with the user interface; and
   causing a text input control to be displayed that requests textual feedback in addition to the feedback expression.

18. The non-transitory computer-readable medium of claim 1, wherein the operations further comprise:
   receiving an image of a facial expression of a user while using the user interface;
   determining a second feedback expression based on the facial expression of the user; and
   comparing the feedback expression to the second feedback expression.

19. A system comprising:
   one or more processors; and
   one or more memory devices comprising instructions that, when executed by the one or more processors, cause the one or more processors to perform operations comprising:
      providing a user interface comprising a view of a button, wherein the view of the button comprises a plurality of regions, and the plurality of regions are associated with icons representing feedback expressions;
      causing the icons representing the feedback expressions to be displayed through animations as an input indicator hovers over corresponding regions in the plurality of regions;
      receiving an input through the button, wherein the input is received at a location on the button;

in response to receiving the input through the button, determining a feedback expression in the feedback expressions that is based on the location on the button at which the input was received; and causing the feedback expression to be stored.

20. A method for determining a feedback expression through a user interface control, the method comprising:

providing a user interface comprising a view of a button, wherein the view of the button comprises a plurality of regions, and the plurality of regions are associated with icons representing feedback expressions;

causing the icons representing the feedback expressions to be displayed through animations as an input indicator hovers over corresponding regions in the plurality of regions;

receiving an input through the button, wherein the input is received at a location on the button;

in response to receiving the input through the button, determining a feedback expression in the feedback expressions that is based on the location on the button at which the input was received; and causing the feedback expression to be stored.

* * * * *